US012340410B1

(12) United States Patent
Gates et al.

(10) Patent No.: US 12,340,410 B1
(45) Date of Patent: Jun. 24, 2025

(54) SYSTEM AND METHOD FOR RECOMMENDING RESALE ALTERNATIVES FOR RETAIL GOODS

(71) Applicant: Phia Holdings Inc., New York, NY (US)

(72) Inventors: Phoebe Gates, New York, NY (US); Sophia Kianni, New York, NY (US); Silas Alberti, Stanford, CA (US)

(73) Assignee: Phia Holdings Inc., New York, NY (US)

( * ) Notice: Subject to any disclaimer, the term of this patent is extended or adjusted under 35 U.S.C. 154(b) by 0 days.

(21) Appl. No.: 19/038,238

(22) Filed: Jan. 27, 2025

Related U.S. Application Data

(63) Continuation-in-part of application No. 18/429,245, filed on Jan. 31, 2024, now Pat. No. 12,248,974.

(51) Int. Cl.
| | |
|---|---|
| *G06Q 30/00* | (2023.01) |
| *G06F 16/9538* | (2019.01) |
| *G06F 40/279* | (2020.01) |
| *G06F 40/40* | (2020.01) |
| *G06Q 30/0601* | (2023.01) |
| *G06T 7/11* | (2017.01) |
| *G06Q 30/0201* | (2023.01) |

(52) U.S. Cl.
CPC ..... *G06Q 30/0631* (2013.01); *G06F 16/9538* (2019.01); *G06F 40/279* (2020.01); *G06F 40/40* (2020.01); *G06T 7/11* (2017.01); *G06Q 30/0206* (2013.01); *G06Q 30/0641* (2013.01); *G06T 2200/24* (2013.01); *G06T 2207/20081* (2013.01); *G06T 2207/20132* (2013.01); *G06T 2207/30176* (2013.01)

(58) Field of Classification Search
CPC ................................. G06Q 30/06–08
See application file for complete search history.

(56) References Cited

U.S. PATENT DOCUMENTS

| | | |
|---|---|---|
| 9,817,900 B2 | 11/2017 | Yan et al. |
| 10,102,448 B2 | 10/2018 | Hill et al. |
| 11,763,360 B1 | 7/2020 | O'Connor |
| 10,846,327 B2 | 11/2020 | Salokhe et al. |

(Continued)

OTHER PUBLICATIONS

Xi, Yunijia et al., "Multi-level Interaction Reranking with User Behavior History", arxiv.org, Apr. 20, 2022 (Year: 2022).*

(Continued)

*Primary Examiner* — Ethan D Civan
(74) *Attorney, Agent, or Firm* — Bold IP, PLLC; Houda El-Jarrah; Troy Schmelzer

(57) ABSTRACT

A recommendation system identifies resale goods corresponding to retail goods being viewed by a user on a retail goods website. Retail goods metadata and images are extracted from the retail goods website using heuristics and LLM-based methods. The extracted retail goods data undergoes ML model-based product category classification, intelligent image cropping, and color detection. Vector embeddings are generated for images and text using ML models and compared to resale goods vector embeddings stored in a vector database. Multiple result sets are retrieved, fused, and re-ranked using LLM-based and preference-aware re-ranking. A data pipeline continuously loads, cleans, and processes resale goods inventory from resale goods websites.

20 Claims, 10 Drawing Sheets

(56) References Cited

U.S. PATENT DOCUMENTS

| | | | |
|---|---|---|---|
| 11,727,463 B2 | 8/2023 | Sollami et al. | |
| 11,804,210 B2 | 10/2023 | Miller | |
| 2008/0250026 A1* | 10/2008 | Linden | G06F 16/904 |
| 2013/0339191 A1* | 12/2013 | Shanfeld | G06Q 30/0627 |
| | | | 705/26.63 |
| 2014/0344102 A1 | 11/2014 | Cooper | |
| 2015/0006325 A1 | 1/2015 | Zhao | |
| 2015/0046281 A1* | 2/2015 | Shivaswamy | G06Q 30/0631 |
| | | | 705/26.7 |
| 2015/0066684 A1 | 3/2015 | K. V et al. | |
| 2016/0189011 A1* | 6/2016 | Bhardwaj | G06T 7/41 |
| | | | 382/155 |
| 2018/0211304 A1* | 7/2018 | Baxter | H04L 67/306 |
| 2018/0276727 A1 | 9/2018 | Patel | |
| 2019/0244407 A1 | 8/2019 | Wiesel et al. | |
| 2020/0226656 A1 | 7/2020 | Hadden | |
| 2020/0311798 A1 | 10/2020 | Forsyth et al. | |
| 2021/0398183 A1 | 12/2021 | Jain et al. | |
| 2022/0012783 A1 | 1/2022 | LaFlamme | |
| 2022/0076318 A1 | 3/2022 | Sazan | |
| 2022/0405706 A1 | 12/2022 | Puthenveetil et al. | |
| 2023/0016483 A1 | 1/2023 | Arnaout et al. | |
| 2023/0031983 A1 | 2/2023 | Hemminger et al. | |

OTHER PUBLICATIONS

Find Anything Secondhand. Get the brands you love for less. https://www.joinbeni.com/ [Date accessed: Oct. 3, 2023].

Xi, Yunjia et al., "Multi-level interaction reranking with user behaviour history", arxiv.org, dated: Apr. 20, 2022. (Year: 2022).

Ueland, Sig, "20 recommerce brands, marketplaces, Platforms", Practical Ecommerce, dated May 22, 2023. (Year: 2323).

International Search Report for international application No. PCT/US2025/013887, Mar. 27, 2025.

Written Opinion of the International Searching Authority for international application No. PCT/US2025/013887, Mar. 27, 2025.

* cited by examiner

FIG. 3

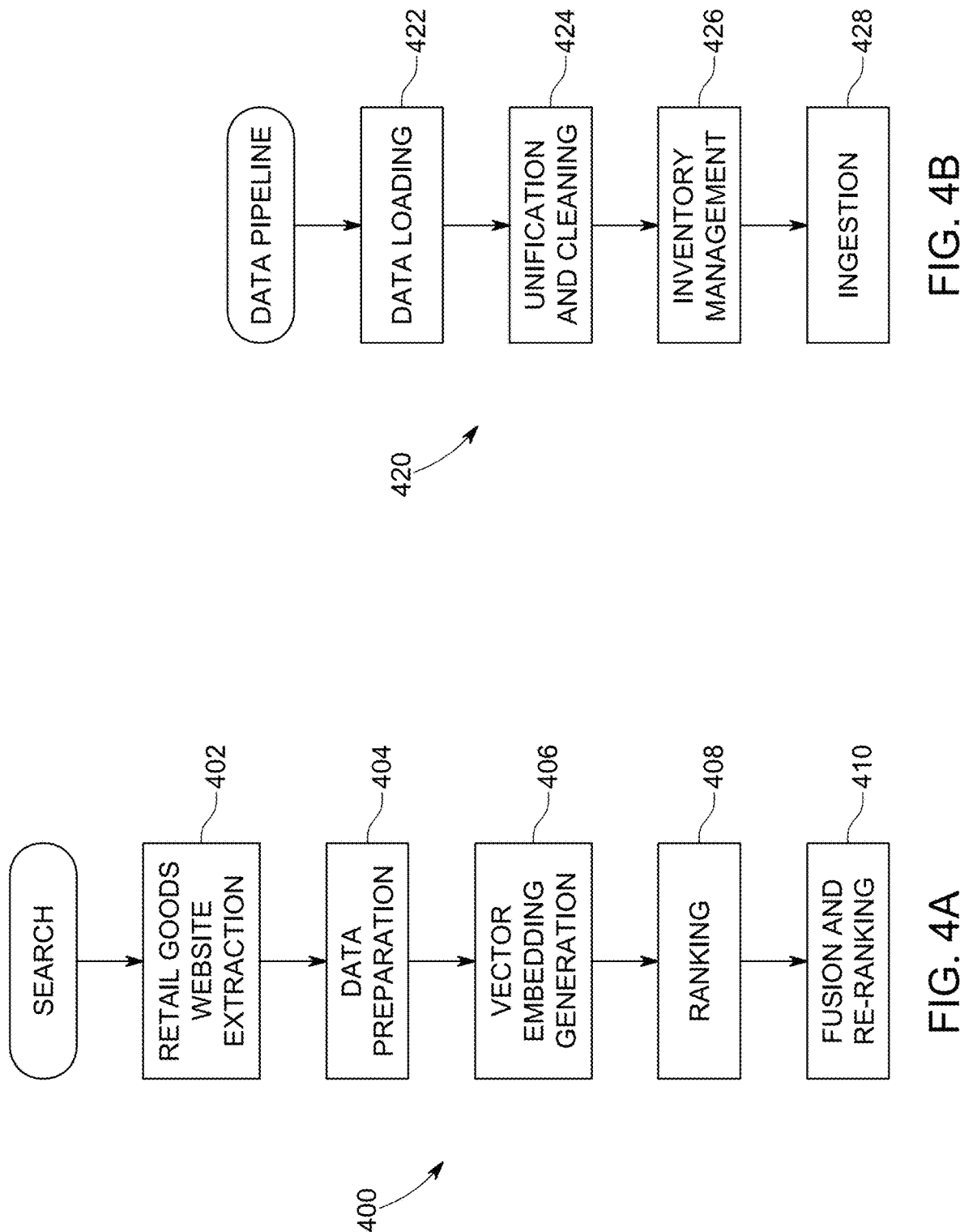

US 12,340,410 B1

SYSTEM AND METHOD FOR RECOMMENDING RESALE ALTERNATIVES FOR RETAIL GOODS

CROSS-REFERENCE TO RELATED APPLICATIONS

This application is a continuation-in-part of U.S. non-provisional application Ser. No. 18/429,245, filed on Jan. 31, 2024, which is incorporated by reference in its entirety.

FIELD

This invention is directed to search and recommendation systems, and in particular, to a recommendation system that automatically suggests resale alternatives for retail goods that a user is viewing on a seller website.

BACKGROUND

Online shopping is the process of buying retail goods or services from a seller over the Internet using a web browser or a mobile application. It is a digital evolution of traditional shopping, enabling consumers to shop from the comfort of their homes or on the go, without having to physically visit a store. While online shopping offers many benefits, it is also associated with several challenges: it is hard to shop sustainably, the cost of goods in combination with shipping and taxes can be expensive, and resale goods can be difficult to find. Reverse image searching and semantic searching of current resale goods marketplaces do not provide adequate results, especially when resale goods such as fashion items and accessories are constantly updated, and can be time and memory consuming. Thus, there is a need for an improved recommendation system that receives data from online sources of resale goods and returns matching or similar results in a streamlined fashion.

SUMMARY

The following summary relates to one or more aspects or embodiments disclosed herein. It is not an extensive overview relating to all contemplated aspects or embodiments, and should not be regarded as identifying key or critical elements of contemplated aspects or embodiments, or as delineating the scope associated with any particular aspect or embodiment. The following summary is provided to present certain concepts relating to one or more aspects or embodiments disclosed herein in a simplified form to precede the detailed description that follows.

Some aspects of this disclosure are directed to a computer-implemented method for identifying resale goods alternatives for resale goods. A retail good is identified on a retail goods webpage. Metadata of the retail good is extracted from the retail goods webpage by extracting the metadata of the retail good using metadata heuristics that analyze metadata structures of the retail goods webpage; performing large language model (LLM)-based extraction to transform unstructured webpage content into structured retail good metadata; and identifying and caching selectors that target HTML tags containing the metadata of the retail good for re-use during subsequent extractions. The retail good is classified into a retail category using keyword heuristics and LLM-based classification. An image of the retail good is cropped to isolate the retail good using the retail category and a segmentation foundation model. A descriptive color word for the retail good is determined using clustering algorithms and color space mapping. Image vector embeddings are generated using a machine learning (ML) image embedding model and text vector embeddings are generated using a ML text embedding model. Multiple ranked result sets are retrieved from a vector database of resale goods including a first result set generated from the image vector embeddings and a second result set generated from the text vector embeddings. The multiple ranked result sets are merged into a unified result set, and the unified result set is re-ranked by applying heuristics-based re-ranking, applying ML language model-based re-ranking, and applying preference-aware re-ranking. The re-ranked unified result set is then returned to the user.

In some implementations, the LLM-based extraction uses instruction-based prompting, few-shot prompting, or a fine-tuned language model to convert the unstructured webpage content into the structured retail good metadata.

In some implementations, the segmentation foundation model comprises a segment anything model (SAM) or a grounding DINO model.

In some implementations, identifying and caching selectors is performed by a machine language (ML) selector extraction component that analyzes a document object model (DOM) of the retail goods webpage.

In some implementations, where the retail goods webpage comprises multiple images of retail goods, size and website heuristics are applied to identify a most representative image of the retail good.

In some implementations, the ML image embedding model is a contrastive language-image pretraining (CLIP) model and the ML text embedding model is a sentence transformer.

In some implementations, the ML image embedding model and the ML text embedding model are fine-tuned using multi-modal alignment, caption generation, and firsthand/secondhand vector alignment.

In some implementations, a third result set generated from a full-text search is retrieved, and the third result set is included in the multiple ranked result sets that are merged into a unified result set.

In some implementations, approximate nearest neighbor (ANN) search algorithms are applied to retrieve the multiple ranked result sets from the vector database.

In some implementations, the multiple ranked result sets are merged into a unified result set using a reciprocal rank fusion (RRF) algorithm.

In some implementations, the heuristics-based re-ranking applies multiple heuristics to give ranking boosts to resale goods of particular relevance.

In some implementations, the ranking boosts comprise price-based boosting, brand-based boosting, and condition-based boosting.

In some implementations, the ML language model-based re-ranking filters out outliers that have not yet been recognized, balances the search results to minimize clusters of visually similar resale goods, and aligns result order with common user preferences.

In some implementations, the ML language model for re-ranking is fine-tuned using labeling and user behavior comprising click data and purchase conversion data.

In some implementations, preference-aware re-ranking comprises prompting the ML language model to incorporate qualitative preferences input by the user.

In some implementations, the qualitative preferences are input by the user through a free-form natural language interface or a form-based user interface comprising sliders and toggles.

In some implementations, the method further comprises a data pipeline preparation process comprising loading and parsing resale goods metadata from resale goods websites; cleaning the resale goods metadata using heuristics and LLM-based models; storing the resale goods metadata in a data warehouse; converting the resale goods metadata into vector embeddings; and ingesting the vector embeddings into the vector database.

In some implementations, the resale goods metadata is loaded and parsed from the partner websites using a loading adapter for each partner website that is configured to convert incoming resale goods metadata from the partner website into a unified format.

In some implementations, rule-based mapping is applied to map the resale goods metadata from partner websites to a standardized taxonomy.

In some implementations, the method further comprises collecting historical resale data for resale goods that closely match the retail good; calculating an average resale value for the retail good based on the collected historical resale data; determining an average resale retention percentage for a brand by analyzing resale data for multiple resale goods within an inventory of the brand; estimating an estimated resale value of the retail good by applying the average resale retention percentage to a retail price of the retail good; adjusting the estimated resale value based on factors comprising condition, market demand, and popularity; updating the estimated resale value as new data becomes available; and providing a final estimated resale value via a graphical user interface.

Various additional aspects of this disclosure are described below and depicted in the accompanying figures and will be further apparent based thereon.

BRIEF DESCRIPTION OF THE DRAWINGS

The present invention is described by way of non-limiting exemplary embodiments that are illustrated in the accompanying drawings, in which like references denote similar elements.

FIG. 3 is a screenshot of another exemplary user interface for the recommendation system, in accordance with aspects of this disclosure.

FIG. 4A is a flow diagram of a search process, in accordance with aspects of this disclosure.

FIG. 4B is a flow diagram of a data pipeline preparation process, in accordance with aspects of this disclosure.

DETAILED DESCRIPTION

Figure 1:
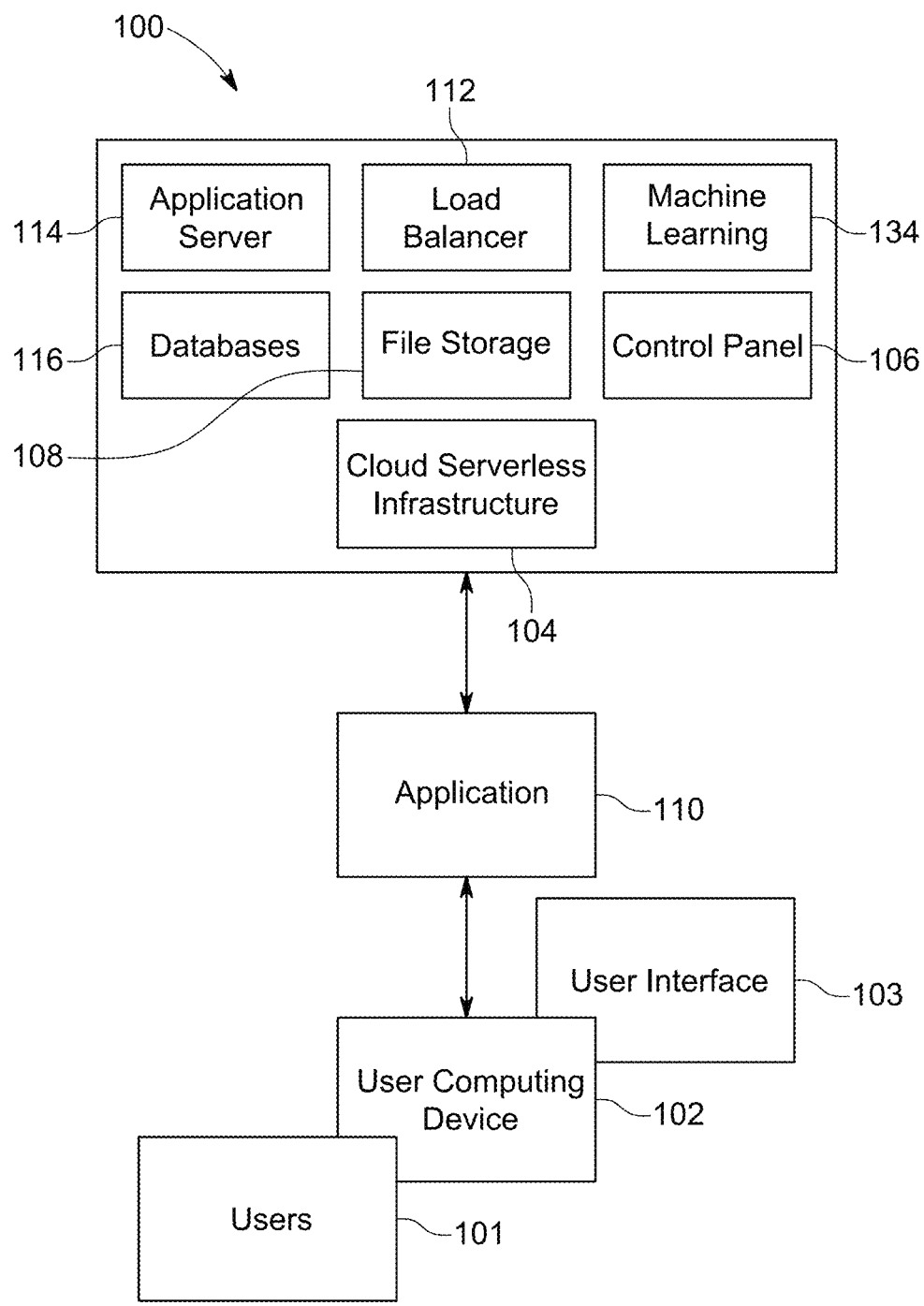
FIG. 1 is a block diagram of a recommendation system, in accordance with aspects of this disclosure.

In this detailed description, the summary above, the claims below, and in the drawings, reference is made to particular features of the invention. It should be understood that this disclosure includes only some of the possible combinations of such particular features.

Where reference is made herein to a method comprising two or more defined steps, the steps may be carried out in any order or simultaneously, and the method may include additional steps that are carried out before, between, or after the defined steps (except where the context excludes these possibilities). In this disclosure, specific details are set forth to provide a thorough understanding of the embodiments described herein. However, those of skill in the art will recognize that the invention may be practiced without some or all of these specific details. In some instances, to avoid unnecessarily complicating the description, features that are well known to those of skill in the art are not described in detail.

In the following description, the terms "goods", "items", and "products" are used interchangeably and collectively refer broadly to any tangible or physical commodity that is produced or exchanged in commerce. Goods, items, and products may comprise, for example and without limitation, clothing and accessories such as dresses, suits, jeans, shirts, skirts, hats, belts, and scarves; footwear such as shoes, boots, and sandals; electronics such as smartphones, computers, printers, televisions, cameras, headphones, and accessories for such electronics; groceries such as food and beverages, produce, dairy products, meats, canned goods, snacks, beverages, and baking ingredients; health and beauty products such as cosmetics, skincare products, perfumes, hair care products, soaps, and medicines; home and garden supplies such as furniture, home decor, kitchenware, bedding, gardening tools, and plants; toys and games such as board games, video games, action figures, dolls, and educational toys; written works such as books, novels, textbooks, and magazines; office supplies such as stationery, notebooks, and pens; sports and outdoor equipment such as sports gear, camping equipment, bicycles, fitness equipment, and outdoor apparel; jewelry such as necklaces, bracelets, earrings, rings, and watches; automotive products such as cars, car parts, accessories, tools, and maintenance items; pet products such as food, toys, grooming tools, and pet health care products; music, movies, and video games including CDs, vinyl records, DVDs, Blu-ray discs, and related accessories; and craft and hobby products such as yarn, fabric, paints, and tools for hobbies such as model building and scrapbooking. These examples of goods, items, and products are merely illustrative and non-limiting; the recommendation system of this disclosure may be used in conjunction with many other goods, items, and products other than those specifically mentioned.

In the following description, the terms "vendor" and "seller" refer generally to merchants, users, and other entities that offer goods, items, and products for sale online and that are searchable by the recommendation system of this disclosure.

In the following description, the term "firsthand" as applied to goods, items, and products, refers to goods, items, and products purchased directly from an original manufacturer, producer, or online retailer that have not been previously owned or used by a consumer. Firsthand goods, items, and products are typically sold in new condition through platforms such as brand websites (e.g., Nike.com) or online marketplaces for new goods (e.g., Amazon.com).

In the following description, the term "resale" as applied to goods, items, and products refers broadly to goods, items, and products that are listed for sale after their initial offering, encompassing previously owned goods, items, and products as well as unsold new goods, items, and products. Resale goods may include "secondhand" goods, which refers to resale goods that have been previously owned, used, or sold by a consumer and are subsequently offered for resale. Secondhand goods are commonly listed on peer-to-peer platforms such as eBay, Poshmark, and Facebook Marketplace, where individuals and businesses sell pre-owned goods in various conditions ranging from like new to heavily used. In addition to secondhand goods, resale goods may also comprise surplus inventory, overstock (unsold inventory from retailers), returned items, and deadstock (older inventory that is no longer actively sold). These examples of resale goods, items, and products are merely illustrative and non-limiting; the recommendation system of this disclosure may be used in conjunction with many other types of resale goods, items, and products other than those specifically mentioned.

In the following description, the terms "retail" and "consumer" as applied to goods, items, and products (i.e., retail goods and consumer goods) refer to any goods, items, and products that are sold in the marketplace, whether they are new or pre-owned. Thus, retail and consumer goods may include both firsthand and resale goods. For example, a dress may be broadly referred to as a retail or consumer good. If the retail or consumer good (the dress) is being sold as new on a brand's website, it may be more narrowly referred to as a firsthand good. Alternatively, if the retail or consumer good (the dress) is being sold as pre-owned or as an overstock item, for example, it may be more narrowly referred to as a resale good.

FIG. 1 is a block diagram of a recommendation system 100, in accordance with aspects of this disclosure. Recommendation system 100 finds resale goods offered for sale online that match or are similar to retail or consumer goods being viewed by a user 101 on a retail or consumer goods website. For example, recommendation system 100 may find resale goods offered for sale online that match firsthand goods being viewed by user 101 on a firsthand website or platform, or firsthand goods that have otherwise been viewed or uploaded by user 101. System 100 extracts information about the retail goods being viewed and uses that information to find matching or similar resale goods. Recommendation system 100 may be implemented in various forms, including but not limited to search engines, browser extensions, software applications, social media integrations, and/or e-commerce platform integrations. These are merely non-limiting examples of ways in which recommendation system 100 may be implemented; system 100 may be implemented in other forms without departing from the scope of this disclosure.

While recommendation system 100 is described primarily in the context of finding resale goods that match or are similar to firsthand goods being viewed by user 101 on a firsthand goods website or platform, recommendation system 100 is more broadly applicable to find resale goods that match or are similar to any type of retail or consumer goods. For example, if user 101 is viewing overstock goods on an overstock goods website, recommendation system 100 may find secondhand and other types of resale goods that match or are similar to the overstock goods being viewed.

Recommendation system 100 maintains a database (e.g., databases 116) of resale goods sourced from a variety of platforms, including both partner websites and non-partner websites. Partner websites refer to vetted and trusted sellers and/or vendors of resale goods that may have established agreements or integrations with recommendation system 100. These may include resale marketplaces, consignment stores, and other authorized platforms that provide reliable and consistent metadata regarding their inventory, such as product descriptions, prices, and availability. Partner websites often deliver this data through structured channels, such as application programming interfaces (APIs) or secure file transfer protocol (SFTP). APIs are software interfaces that enable seamless, automated communication between systems, allowing partner websites to transmit real-time inventory data to the recommendation system. SFTP, a secure network protocol, facilitates the scheduled transfer of bulk data files (e.g., inventory lists) from partner websites.

In addition to partner websites, recommendation system 100 may also source data from non-partner websites, such as smaller independent retailers, private sellers, and user-generated marketplaces. These sources may not provide structured data feeds like APIs or SFTP, such that recommendation system 100 may need to rely on extraction techniques such as scraping to collect metadata directly from non-partner websites. The combination of data from partner and non-partner websites allows recommendation system 100 to maintain a comprehensive and diverse database of resale goods. Recommendation system 100 searches this comprehensive database of resale goods to determine whether matches or similar resale goods are available that correspond to retail goods being searched for by user 101. Recommendation system 100 enhances the accuracy and relevance of matching or similar resale goods returned by the search process by utilizing artificial intelligence (AI) and machine learning (ML) models, as will be described in detail herein.

User 101 may be any individual or entity browsing the Internet or other network using computing device 102, which may encompass a wide range of devices, including but not limited to a personal computer, desktop computer, laptop, computer notebook, tablet, smartphone, Internet of Things (IoT) device, or any other electronic device capable of network communication and graphical display. Computing device 102 provides the hardware and software platform necessary for interaction with user interface 103, enabling user 101 to access and navigate recommendation system 100.

User interface 103, illustrated conceptually in FIG. 1, may be a graphical user interface (GUI) that is accessible from computing device 102. It enables user 101 to interact with recommendation system 100 and facilitates browsing of the Internet or other networks. User interface 103 may incorporate a variety of interactive elements, including operating buttons and icons designed to execute specific processes or actions in response to user selections. User interface 103 may also feature conventional GUI elements to enhance navigation and usability, such as title bars, text boxes, toolbars, pull-down menus, tabs, scroll bars, context help, dialog boxes, and status bars. Such features enable user 101 to seamlessly navigate throughout interface 103, perform searches, and interact with various components of recommendation system 100, such as initiating queries for resale goods or accessing search results.

Figure 2:
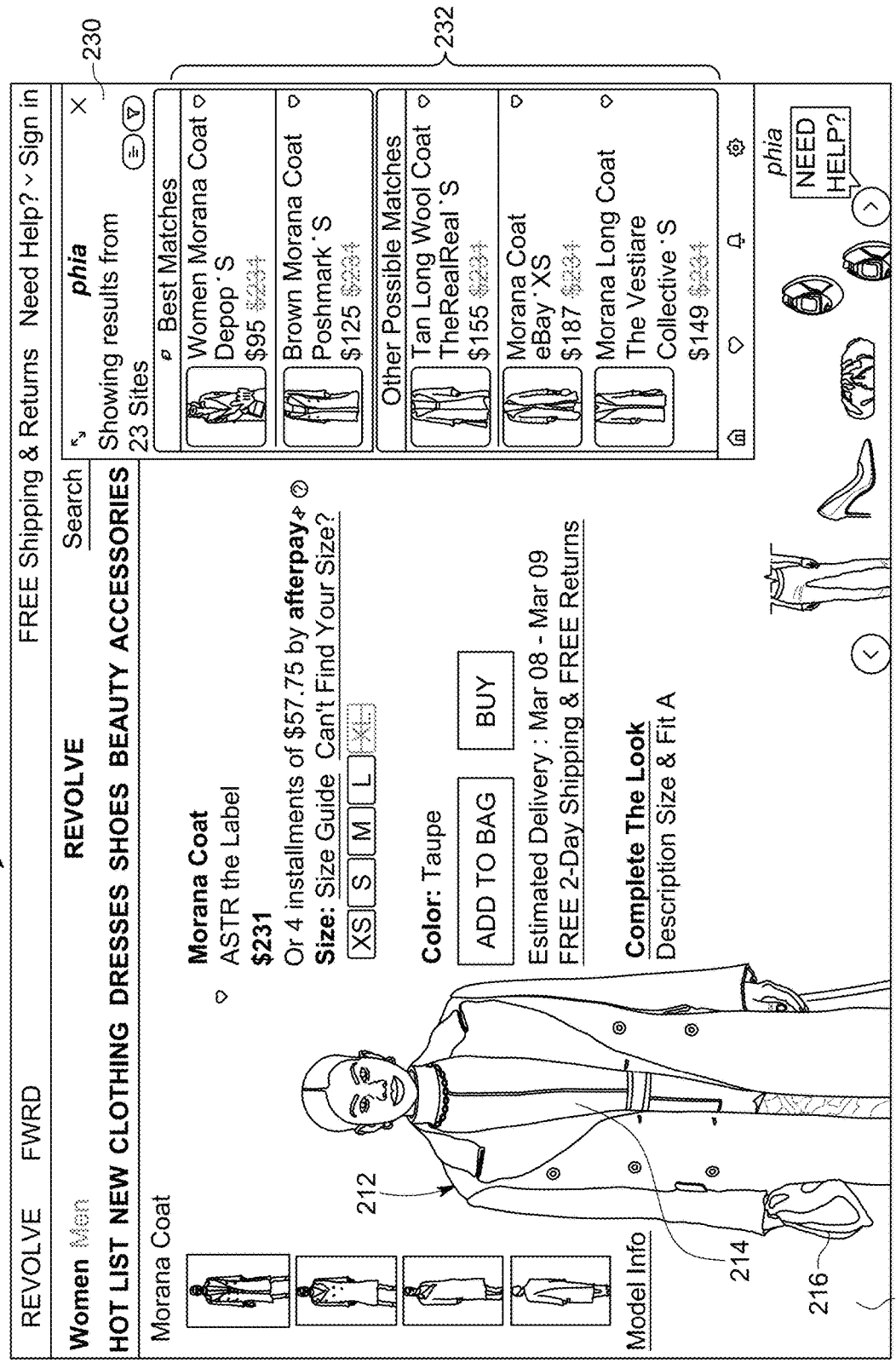
FIG. 2 is a screenshot of an exemplary user interface for the recommendation system, in accordance with aspects of this disclosure.
Figure 3:
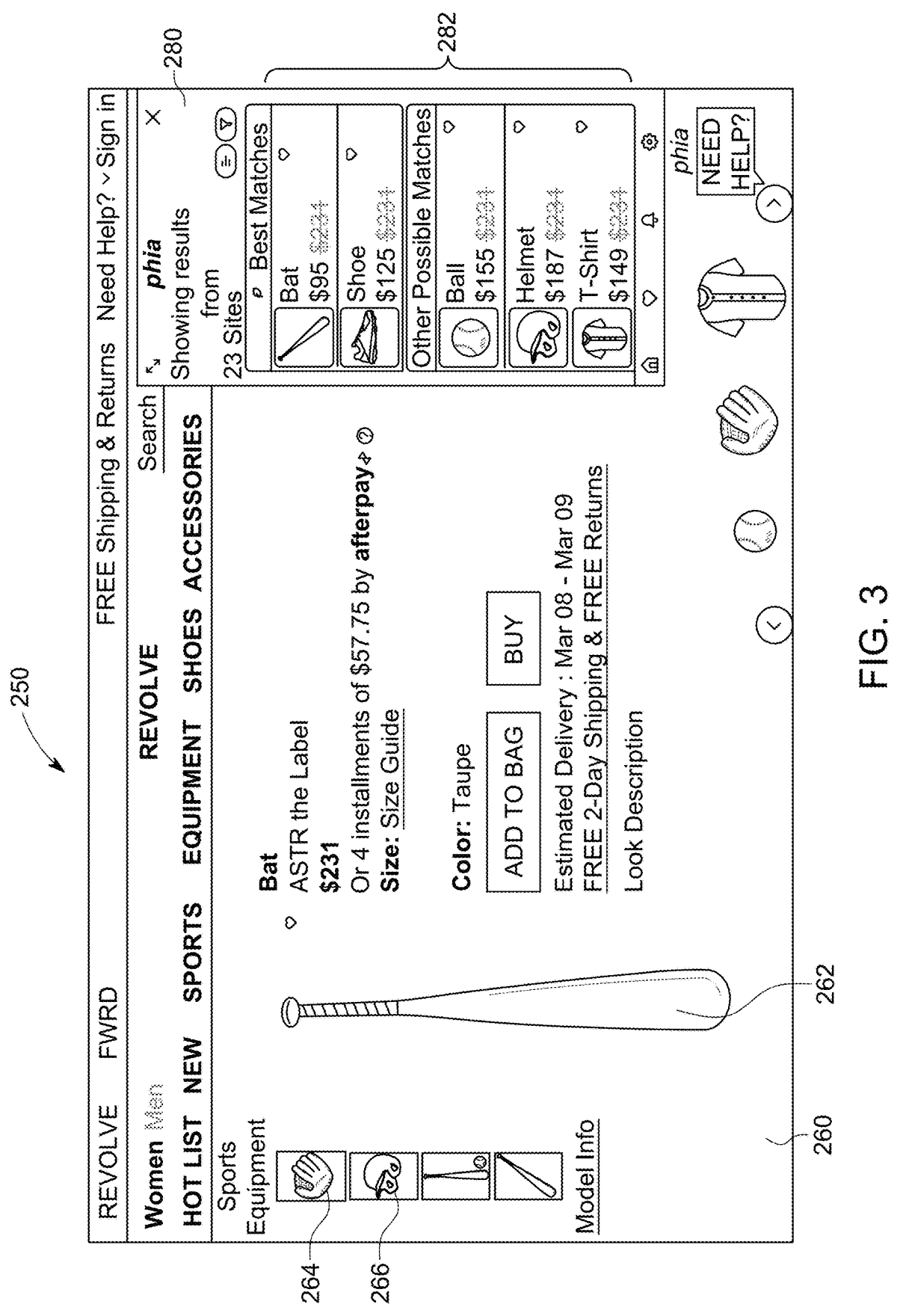

FIGS. 2-3 are screenshots 200 and 250 illustrating examples of user interface 103, in accordance with aspects of this disclosure. Screenshots 200 and 250 depict specific implementations of user interface 103 that facilitate user interaction with recommendation system 100. In these non-limiting examples, recommendation application 110 (FIG. 1) operates as a browser extension, seamlessly integrating with retail goods websites to enhance the browsing experience for user 101 by incorporating information retrieved by recommendation system 100, such as matching or similar resale goods, directly into the existing layout of retail goods websites. As described below, recommendation application 110 is not limited to implementation as a browser extension and may be implemented in other ways, such as a standalone application, a mobile app, or an integrated feature within a retailer's native platform.

FIG. 2 is a screenshot 200 depicting an example of user interface 103 where recommendation application 110 integrates into a retail goods website interface 210 displaying retail goods 212 (in this case, a Morana coat) along with associated details such as brand, price, size, color, and purchasing and shipping options. Retail goods website 210 represents the native interface of the retail seller and forms part of user interface 103. Integrated into retail goods website interface 210 is a browser extension or sidebar 230, which is generated by recommendation system 100 through application 110 (FIG. 1) and also forms part of user interface 103. Browser extension 230 displays resale goods 232 that match or are similar to retail goods 212 of interest to user 101. Associated details for resale goods 232, such as the resale seller website, brand, price, size, and color, are also displayed in sidebar 230. As illustrated, browser extension 230 integrates seamlessly into existing retail goods website interface 210 to form user interface 103, enhancing the user's browsing experience by providing immediate comparisons to resale alternatives.

FIG. 3 is a screenshot 250 depicting another example of user interface 103, with a retail goods website interface 260 displaying retail goods 262 (in this case, a baseball bat) and associated product details. A browser extension or sidebar 280 generated by recommendation system 100 via application 110 integrates into retail goods website interface 260 to display resale goods 282 that match or are similar to retail goods 262. Details such as resale price, seller, and product attributes are provided in sidebar 280, which enhances user interface 103 by embedding relevant resale options directly within the existing retail goods browsing experience.

Recommendation system 100 is not limited to the browser extension implementation depicted in FIGS. 2-3. It can alternatively be deployed, for example, as a standalone desktop or web application, a mobile app, or as an embedded feature within a retailer's own platform. This versatility enables recommendation system 100 to adapt to various user environments and facilitates identification of matching resale goods across various devices and contexts. For example, a standalone application may enable users to directly input search queries, while integration within a retailer's native mobile app could streamline access to resale goods from within an existing platform. Recommendation application 110 provides the backend functionality to support these varied implementations. Application 110 may be developed using frameworks such as Next.js, which provides tools for building server-side rendered web applications, or Plasmo, which streamlines the creation of browser extensions. When implemented as a browser extension, application 110 may be compatible with well-known browsers such as Chrome, Firefox, Safari, Edge, Arc, etc.

Application server 114 (FIG. 1) functions as a hub for executing operations of recommendation system 100 and as an intermediary between system components, managing recommendation application 110 and coordinating access to its features and communication with user computing device 102. Recommendation system 100 may include one or more application servers 114, which may comprise web servers, database servers, or any other servers capable of handling data storage, retrieval, and processing. Application server 114 may be deployed remotely, such as on a computer network or cloud-based infrastructure, including the Internet, or locally on electronic devices such as computers, mobile phones, or other portable or stationary devices. Application server 114 may operate as a virtual machine, dedicated physical device, shared hardware system, or specialized computing service, depending on implementation requirements.

Application server 114 may comprise front-end and back-end web servers that work together to manage communication, data processing, and delivery of services to application 110 and user device 102 via a network such as the Internet. This may include handling user requests, such as search queries or interaction with recommendation system 100, and delivering the resulting user interface elements, such as the resale goods recommendations displayed in user interface 103 (e.g., in the example of FIGS. 2-3, sidebars 230, 280 that overlay website interfaces 210, 260). The front-end server ensures that recommendation application 110 remains responsive and accessible through user interface 103. The back-end web server performs the underlying operations required to support the front-end services, such as processing data, executing instructions, and retrieving or updating resale goods data stored in database 116. The back-end web server may be deployed on the same network or on the same machine as a database server.

Cloud serverless infrastructure or architecture 104 is a cloud-based system that dynamically manages hardware and software resources needed to support recommendation system 100. Cloud serverless infrastructure 104 is well-suited for performing large-scale data collection and processing tasks, such as sending HTTP requests, analyzing web content, extracting links, images, and product metadata, and handling other large-scale event-driven operations. It provides on-demand computing power, networking, and storage, all managed by a cloud service provider. Some examples of cloud serverless infrastructure providers include, without limitation, Amazon Web Services (AWS), Google Cloud Platform (GCP), and Microsoft Azure. Non-limiting examples of components that may be included in cloud serverless infrastructure 104 include serverless computing services such as Google Cloud Functions or AWS Lambda, storage services such as Google Cloud Storage or Amazon S3 for storing metadata and JSONL files, Kubernetes-based systems for distributed GPU processing to generate embeddings, vector databases such as Pinecone for embedding storage and retrieval, and relational databases such as BigQuery for managing large-scale historical and inventory data.

Cloud serverless infrastructure 104 minimizes the need for manual server provisioning and maintenance by automatically deploying and scaling resources as needed. Infrastructure 104 operates as an event-driven, fine-grained system, where individual processes and functions (e.g., extracting metadata for firsthand and resale goods, running search queries, generating resale recommendations, etc.) are executed in response to specific user actions. For example, when a search for resale alternatives is initiated, cloud serverless infrastructure 104 activates the necessary resources to process the request. Once the task is completed, the resources automatically scale down, optimizing efficiency and reducing costs. Cloud serverless infrastructure 104 may also include a virtual private cloud (VPC), which is a secure, configurable pool of shared computing resources within a public cloud environment, providing a measure of isolation between different users and organizations.

Application server 114 and cloud serverless infrastructure 104 are connected to one or more databases 116 that provide the foundation for storing, retrieving, modifying, and managing data essential to operation of recommendation system 100. Database 116 may be physically or logically partitioned into multiple databases and may store various types of information associated with the functionality of recommendation system 100 such as (without limitation) user account data, retail goods images viewed by users, search queries, resale goods data and inventory, potential resale goods matches retrieved from partner websites, and so on. Database 116 may include storage components such as hard disk drives (HDDs) and/or solid state drives (SSDs). In some embodiments, database 116 may comprise a storage area network (SAN) or a network attached storage (NAS) system. Where application server 114 includes the necessary storage components, database 116 may be integrated into application server 114. Such integration allows for streamlined access and efficient data management within the same physical system, reducing latency for tasks like data retrieval and updates. Alternatively, database 116 may be external to application server 114, operating as a separate system that communicates with server 114 over a network.

Application server 114 and cloud serverless infrastructure 104 comprise one or more processors that execute instructions to carry out the operations of recommendation system 100. These instructions may include search queries, data processing tasks, communication protocols, and any other tasks required for operation of system 100, and may be stored in database 116 or other memory components associated with system 100. In some embodiments, the processor may include multiple processing units configured in a multi-core architecture, allowing for parallel execution of tasks. This is particularly useful when handling complex operations such as processing search requests, generating resale goods recommendations, and running machine learning models. The processor is operatively coupled to a communication interface that enables application server 114 and cloud serverless infrastructure 104 to communicate with external devices and systems. The communication interface facilitates exchange of data with user computing device 102 (e.g., receiving search queries and transmitting search results) and supports communication with other networks, remote servers, or cloud-based services to retrieve and process resale goods data.

Application server 114 and cloud serverless infrastructure 104 are configured to communicate with user computing device 102, which may be a personal computer, laptop, tablet, smartphone, or the like. User computing device 102 is configured to execute and display recommendation application 110 via user interface 103, which serves as the interface through which user 101 interacts with recommendation system 100. As mentioned above, recommendation application 110 may be implemented as a browser extension, a standalone application, a mobile app, or another suitable implementation. With reference to FIGS. 2-3, for example, based on the interaction of user 101 with firsthand goods 212, 262 displayed on firsthand goods websites 210, 260, recommendation application 110 may transmit a search request including parameters such as metadata and images for the retail goods being viewed by user 101 to application server 114. Application server 114 and cloud serverless infrastructure 104 process the request, execute search functions that will be described in detail below to generate matching or similar resale goods recommendations, and return the results to application 110. Recommendation application 110 presents the returned results (e.g., the closest matching and similar resale goods 232, 282) in user interface 103, such as (in one non-limiting example) in browser extension sidebars 230, 280 overlaid on retail goods website interfaces 210, 260.

Referring again to FIG. 1, machine learning system 134 comprises algorithms and training models configured to perform data analysis and generate resale goods recommendations. Machine learning system 134 may implement supervised learning techniques, where input data is labeled, and the model is trained to recognize patterns or relationships between inputs and outputs. These techniques may include classification processes that apply rules and assumptions, such as treating inputs as independent variables, to simplify and optimize the learning process. Machine learning system 134 executes a defined sequence of instructions that enables it to learn from historical data and past experiences. Through this iterative process, system 134 improves its ability to analyze new data and perform computations that support decision-making, such as generating accurate resale recommendations. As database 116 grows with additional information and datasets—such as product images and data, search history, and user interactions—system 134 continues to refine its learning, resulting in increased accuracy and improved predictive capabilities. Thus, recommendation system 100 adapts over time to understand user preferences and is trained in part based on user feedback. Though conceptually illustrated as a separate block in FIG. 1, machine learning system 134 may be incorporated in cloud serverless architecture 104, application server 114, or other suitable components of recommendation system 100.

Cloud serverless infrastructure 104 may access or integrate directly with resale goods websites to search inventory and to retrieve metadata and images associated with the resale goods offered for sale on the website. Cloud serverless infrastructure 104 may access seller-provided images of resale goods, along with associated metadata and links, before analyzing the retail goods images being viewed (or uploaded) by user 101. Infrastructure 104 may perform searches across an entire website, a subset of its pages, or external platforms such as search engines and image-sharing platforms. Parsing of web content may include, but is not limited to, hypertext markup language (HTML) parsing, text extraction, and link analysis to identify and extract relevant product metadata and details. Some web pages may include structured data in formats such as JSON, XML, CSV, or microdata, which can be parsed to extract attributes, reviews, and other relevant information associated with resale goods. Machine learning system 134, which may operate within cloud serverless infrastructure 104, may analyze the extracted data to efficiently identify matching or similar resale goods as will be described in more detail herein.

To provide accurate and comprehensive resale goods recommendations, cloud serverless infrastructure 104 must collect and update resale goods data from various sources, which may include (as described above) partner websites as well as other non-partner websites and platforms. In some embodiments, cloud serverless infrastructure 104 may perform a systematic data collection process to gather relevant resale goods information. In some examples, the data collection process may begin with a predefined list of initial or seed URLs, which serve as starting points for accessing relevant web content. Cloud serverless infrastructure 104 may send HTTP requests to these URLs to retrieve web pages and analyze their HTML content to identify links to additional pages, images, and metadata associated with resale goods.

In some embodiments, cloud serverless infrastructure 104 may be configured to focus exclusively or primarily on partner websites, where trusted and vetted sellers offer resale goods for sale and provide inventory, images, and data associated with those resale goods. By accessing primarily partner websites, cloud serverless infrastructure 104 can efficiently retrieve structured and accurate data without performing broader searches across non-partner platforms. Partner websites generally provide efficient and quicker access to the needed images, descriptions, prices, availability, and other details associated with resale goods. As described above, for example, partner websites may deliver resale goods data through structured channels, such as application programming interfaces (APIs) or secure file transfer protocol (SFTP).

In some embodiments, cloud serverless infrastructure 104 may expand its process beyond content on partner websites to follow links to additional pages on non-partner websites, thereby accessing interconnected web content and gathering comprehensive resale goods information. During this operation, cloud serverless infrastructure 104 may extract and collect image URLs and associated metadata from accessed websites, such as names, descriptions, and pricing details associated with resale goods. The retrieved data is analyzed, processed, and stored in database 116, and used to identify and match resale goods alternatives as described below.

Machine learning system 134 comprises heuristics and large language models (LLMs) that clean and preprocess resale goods data by automatically identifying and correcting errors, inconsistencies and other issues within datasets. Cloud serverless infrastructure 104 may apply heuristics to establish rules and validation checks for ensuring that data collected from retail goods websites is stored in a specific and consistent format. For example, heuristics can verify that values in the dataset conform to expected data types (e.g., numerical prices, text-based descriptions, or image URLs). If data values deviate significantly from the expected types or formats, cloud serverless infrastructure 104 may flag the data for review, eliminate it, or repeat the data extraction and validation process.

LLMs within machine learning system 134 may complement these processes by analyzing and standardizing unstructured text data. LLMs can correct spelling and grammatical errors, resolve typos, and input missing words or fields based on patterns and relationships within the dataset. For instance, missing details such as brand names or product dimensions may be predicted based on historical data and similar entries. LLMs may also identify and standardize data such as names, brands, companies, and types of outfits, ensuring uniformity across the dataset. Heuristics and LLMs may work together to identify and remove duplicate inventory entries of resale goods on different resale goods websites by comparing specific attributes. For example, recommendation system 100 may detect that the same dress is being sold for eighty dollars on two different websites, identifying minor deviations such as variations in descriptions or images. During these operations a caching process may be used whereby frequently accessed data—such as data related to specific websites, sellers, or resale goods entries—may be stored in an easily accessible location such as a cache or database to reduce the time and resources required to fetch the data from a slower, primary storage location.

To ensure that data remains up to date, cloud serverless infrastructure 104 may track and monitor resale goods websites for inventory changes on a regular basis or over customizable intervals, such as hourly, daily, weekly, or monthly. This inventory management process is critical because ingesting new data into the search index is computationally expensive. Cloud serverless infrastructure 104 may detect and add new resale goods to the search index, update stored resale goods with modified metadata, such as price, availability, and descriptions, and remove resale goods that are no longer available from the search index. Application server 114 may implement strategies to manage large-scale data collection, including rate limiting to avoid overloading websites, managing different types of website pagination, and handling duplicate content.

Cloud serverless infrastructure 104 may incorporate optical character recognition (OCR) technology and other computer vision technologies to analyze and extract content from images of retail goods. OCR enables recommendation system 100 to identify and extract text-based information from images, such as names, descriptions, prices, and other text associated with retail goods. Computer vision technologies may also detect and identify the presence, location, and types of objects within images of retail goods, such as clothing items and accessories.

In addition to analyzing image content, cloud serverless infrastructure 104 may analyze image metadata, including alt text and title attributes, using image recognition algorithms or application programming interfaces (APIs) to connect to third party computer vision services such as Google Cloud Vision or Amazon Rekognition. Cloud serverless infrastructure 104 may also apply pattern matching techniques such as regular expressions (regex) to identify and extract image URLs from web content. Once collected, cloud serverless infrastructure 104 stores the extracted results, including image URLs, metadata, and other relevant contextual information, in a structured format such as a database, CSV file, or JSON file.

The images of retail goods stored by cloud serverless infrastructure 104 may be preprocessed and converted into numerical vectors or embeddings that can be used in machine learning and computer vision tasks. Vectors or embeddings are numerical representations of images that encode their key features, such as shape, color, texture, etc., into a structured format that allows for efficient comparison and analysis. These representations enable recommendation system 100 to identify similarities between images and match items effectively. The retail goods images are first preprocessed, which includes resizing to a consistent resolution to standardize dimensions and scaling pixel values to a common range, such as [0, 1] or [−1, 1], to normalize intensity characteristics. The pixel values may also be flattened so that each pixel intensity value can be used as an element in a vector representation of the image. Additionally, histograms of pixel intensity values may be computed for different color channels, such as red, green, and blue, or for different color spaces.

Once the retail goods images are preprocessed, machine learning system 134 may utilize deep learning models to automatically extract hierarchical features and convert the images into embedding vectors for use in the search algorithm. Hierarchical features are progressively learned patterns, starting from low level features such as edges, lines, and textures, to mid-level features like shapes and parts of objects, and finally to high-level features that represent entire objects, such as a handbag, dress, or pair of shoes. Hierarchical feature extraction enables the model to analyze images at multiple levels of detail, improving its ability to identify similarities and extract meaningful representations of items.

The deep learning models may have encoder-only or encoder-decoder architectures, depending on the task. In encoder-only architectures, such as those based on convolutional neural networks (CNNs) or transformer encoders, the input image is processed through several layers. Convolutional layers detect spatial patterns like edges, textures, and shapes, while pooling layers reduce the feature map size, preserving key information and improving computational efficiency. At the end of the CNN, fully-connected layers combine and interpret the flattened features, producing a compact embedding vector that encodes the significant features of the image. Transformer-based encoders, in contrast, use attention layers to analyze relationships across the entire image, enabling the model to effectively capture both local and global patterns. In encoder-decoder architectures, the encoder generates a context vector representing the significant features of the image, and a decoder transforms this representation into a textual description, also known as a caption, that describes the content of the image in natural language (e.g., "red leather handbag" or "blue cotton shirt"). These captions facilitate cross-domain comparisons between visual and textual data, allowing text-based search queries to match with relevant images. The resulting embedding vectors serve as numerical representations of the images, enabling efficient comparison, searches, and matching processes within recommendation system 100.

In some embodiments, machine learning system 134 implements a machine learning model based on the contrastive language-image pretraining (CLIP) architecture, which uses a contrastive loss function to align text and image inputs in a joint embedding space. A joint embedding space refers to a shared numerical space where both image and text features are mapped into embedding vectors with similar representations if they are semantically related. For example, an image of a red handbag and the text description "red leather handbag" would be placed close together in a joint embedding space. This alignment allows for efficient comparisons and searches across different modalities (i.e., visual and textual data). The CLIP model extends the hierarchical feature extraction described in the previous paragraph by enabling cross-domain capabilities. While deep learning models such as CNN-based encoders focus on representing images as embeddings, CLIP integrates textual inputs as well. By learning relationships between image and text pairs during training, CLIP enables the system to interpret and compare both domains in a unified search index.

The contrastive loss function used in CLIP is an optimization goal that teaches the model to bring related image-text pairs closer together in the joint embedding space while pushing unrelated pairs further apart. During training, the loss function assigns a low loss (good) when related pairs are close in the embedding space and a high loss (bad) when unrelated pairs are too close. In CLIP, the loss function may use cosine similarity or dot product to measure how similar two embeddings are. As a result, the CLIP model allows recommendation system 100 to perform searches across image and text domains seamlessly. For example, a text input, such as a natural language query like "red handbag," can retrieve relevant images from the search index, while an image input, such as a photo of a particular retail item, can retrieve associated textual information like descriptions, labels, or tags. The embeddings vectors generated by CLIP represent the extracted features of both images and text in a unified numerical format, enabling efficient cross-modal comparisons and accurate retrieval results.

The machine learning model in machine learning system 134 may also function as a foundation model, which refers to a large-scale model pretrained on massive datasets, often containing millions or even billions of data points. A foundation model serves as a general-purpose model capable of understanding and generating representations for a wide variety of tasks across different domains. The CLIP model is an example of a foundation model that learns a joint embedding space for both image and text inputs through its pre-training process. While foundation models such as CLIP start with general training on diverse data, they can be fine-tuned to specialize in specific domains, such as the retail goods domain for example. Fine-tuning involves further training the model on a curated dataset of retail goods images and their corresponding textual descriptions or captions. This domain-specific fine-tuning improves the model's ability to represent retail goods-related concepts like brands, materials, and categories, ensuring that it can better capture the nuances and details specific to retail goods. The textual descriptions, or captions, for the curated fashion dataset may be synthetically generated using partner-provided data, ensuring consistency and completeness across the dataset. During fine-tuning, the system may continue to use the CLIP contrastive loss function—which aligns image embeddings and text embeddings in the same numerical space—or any other loss function compatible with the machine learning model's architecture. This fine-tuning process enhances the model's performance for tasks specific to the retail goods domain.

Control panel 106 (FIG. 1) serves as a backend monitoring and management dashboard for recommendation system 100, allowing administrators to oversee system performance, troubleshoot issues, and manage user data stored in database 116. In some embodiments, control panel 106 may generate and provide analytics to monitor and optimize user engagement, viral growth, and post-purchase behavior. Key metrics such as daily active users (DAU), monthly active users (MAU), churn rate, and user actions such as signups, app opens, and searches may be tracked. Viral analytics may measure the performance of referral programs through metrics such as the viral coefficient (K-score), referral conversion rates, and the total number of referrals initiated and completed. Post-purchase analytics such as average order cost, average order payout, and the number of repeat purchasers may provide insights into buyer activity and may integrate with conversion tracking systems of partner websites.

File storage 108 provides storage for data that needs to be accessed by servers, applications, or other components of recommendation system 100. While database 116 stores structured, queryable data, file storage 108 stores unstructured or large-scale data. Load balancer 112 may be provided between user devices 102 and backend servers—including application servers 114 and cloud serverless infrastructure 104—to enhance the availability, responsiveness, and scalability of recommendation system 100. Load balancer 112 ensures that incoming requests such as search queries are distributed evenly across multiple servers to prevent overload and ensure consistent performance. Elastic load balancing dynamically adjusts the distribution of traffic based on current demand, automatically allocating requests to servers, containers, or IP addresses with available capacity. This improves fault tolerance and minimizes latency by redirecting traffic in the event of server failure or high load.

Figure 4C:
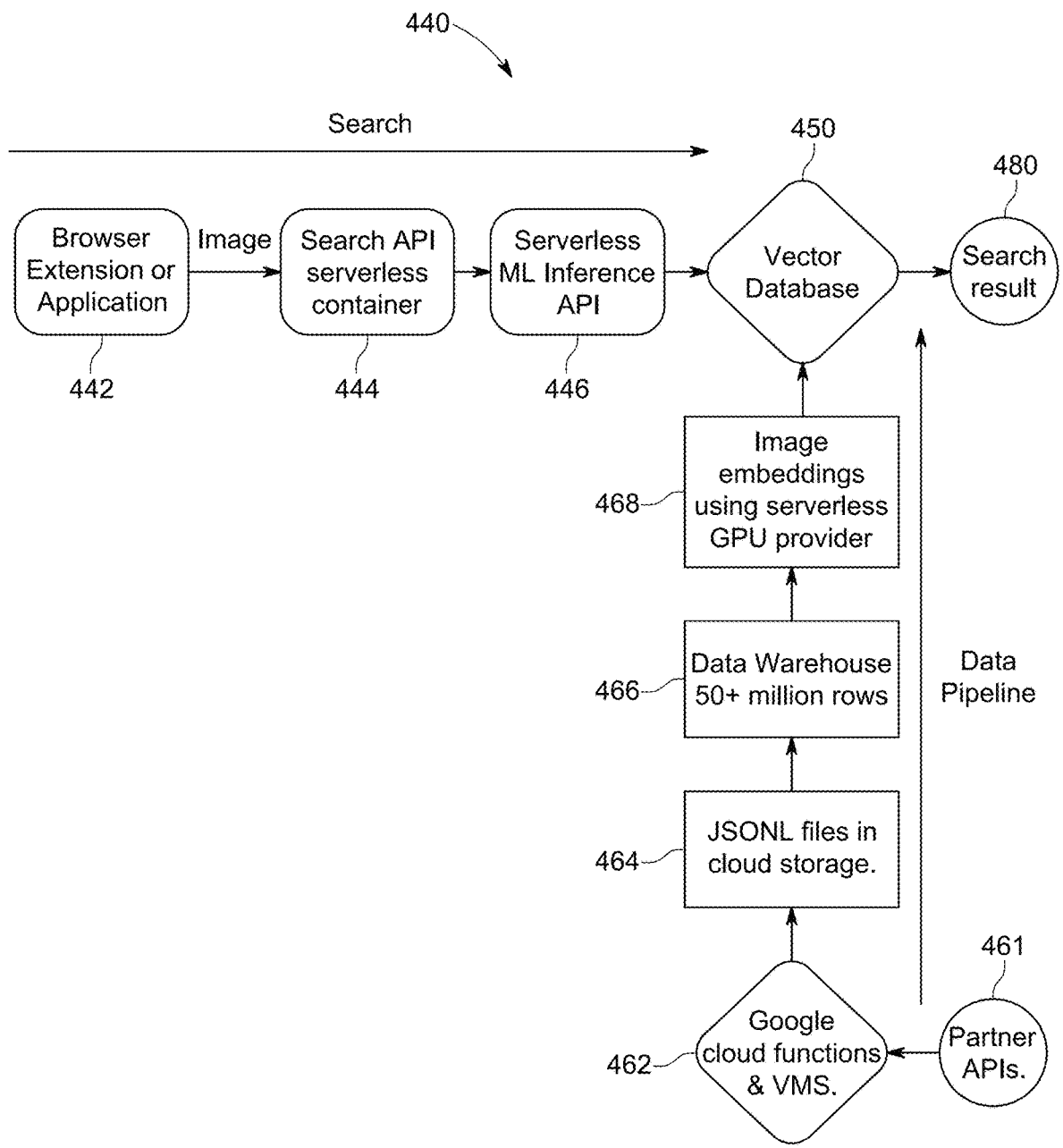
FIG. 4C is a flow diagram providing a conceptual overview of system components involved in the search process and data pipeline preparation process, in accordance with aspects of this disclosure.

In a non-limiting embodiment, recommendation system 100 comprises two primary operational processes: search process 400, which is conceptually illustrated in FIG. 4A, and data pipeline preparation process 420, which is conceptually illustrated in FIG. 4B. FIG. 4C is a flow diagram 440 providing a conceptual and integrated overview of search process 400 and data preparation pipeline process 420 in terms of exemplary system components that may be involved in executing those processes.

Referring to FIG. 4A, search process 400 is a multi-step process that is initiated by a user viewing a retail goods website or uploading a retail goods image. In some examples, the retail goods are firsthand goods. Recommendation system 100 may implement search process 400 via application 110 in various forms, including but not limited to search engines, browser extensions, mobile applications, social media integrations, and/or e-commerce platform integrations. In step 402, metadata and image data associated with retail goods being viewed by user 101 is extracted from a retail goods website. The extracted retail goods data undergoes data preparation in step 404, which includes tasks such as product category classification, intelligent image cropping and selection, and intelligent color detection. Vector embeddings are generated from the prepared data in step 406 using machine learning models such as CLIP to enable semantic searching and comparisons. Search process 400 continues with ranking step 408, in which the generated retail goods vector embeddings are compared against resale goods vector embeddings that have been ingested into a vector database to generate multiple ranked result sets. In step 410, the multiple result sets are merged (fused) and re-ranked into a final result list. Steps 402-410 of search process 400 are described in greater detail below.

Referring to FIG. 4B, data preparation pipeline process 420 is also a multi-step process. In step 422, resale goods inventory data is loaded and parsed from partner websites and platforms and, in some examples, non-partner websites and platforms. In step 424, a combination of heuristics and LLM-based approaches are applied to clean the resale goods data, including bringing the data into a common categorization scheme and filling in missing fields. Step 426 of inventory management involves maintenance of a resale goods data warehouse and continually tracking inventory changes. In step 428, the cleaned and categorized resale inventory data is converted into vector embeddings and ingested into the vector database. Steps 422-428 of data preparation pipeline process are described in greater detail below.

Search—Initiation

Referring again to FIG. 4A, search process 400 is a multi-step process that is initiated in some examples by user 101 viewing a retail goods website or uploading a retail goods image. The retail goods website may be, for example, a firsthand goods website where a seller or vendor sells firsthand goods. User 101 may interact with recommendation system 100 either as a registered member, by completing an initial registration process, or as an unregistered user without requiring login credentials. Application 110 of recommendation system 100 may be downloaded and installed on user device 102 as a browser extension integrated into a web browser, such as Chrome, Edge, or Safari, as a standalone application, as a mobile app, or as any other suitable implementation. As illustrated in FIGS. 2-3, integration of application 110 as a browser extension allows recommendation system 100 to operate seamlessly within the user's browsing experience, monitor user activity on retail goods websites, and automatically initiate searches for matching or similar resale goods based on that activity.

During a typical user session, recommendation application 110 (e.g., browser extension 442 of FIG. 4C) automatically detects when user 101 is viewing or interacting with an item on a retail goods website, such as for example retail good 212 (e.g., a Morana coat) on retail goods website 210 of FIG. 2. Recommendation application 110 identifies user activity based on predefined triggers, such as clicking on images of retail goods, interacting with a search window, or spending a predefined amount of time on a webpage directed to a particular retail good. These user interactions serve as a basis for recommendation system 100 initiating a search for matching or similar resale goods.

In addition to automatically detecting items being viewed on a website by user 101, application 110 may also provide for manual uploads of images of retail goods by user 101. For example, user 101 may capture an image of retail goods using an integral camera on user device 102, such as a smartphone or tablet, or may transfer an image from an external device, such as a digital camera. Alternatively, user 101 may upload existing images obtained from a social media platform, ecommerce platform, another website, or their personal photo gallery. Application 110 may receive such user-uploaded images and prepare them for further processing by recommendation system 100.

Search—Extraction Step 402

Figure 5:
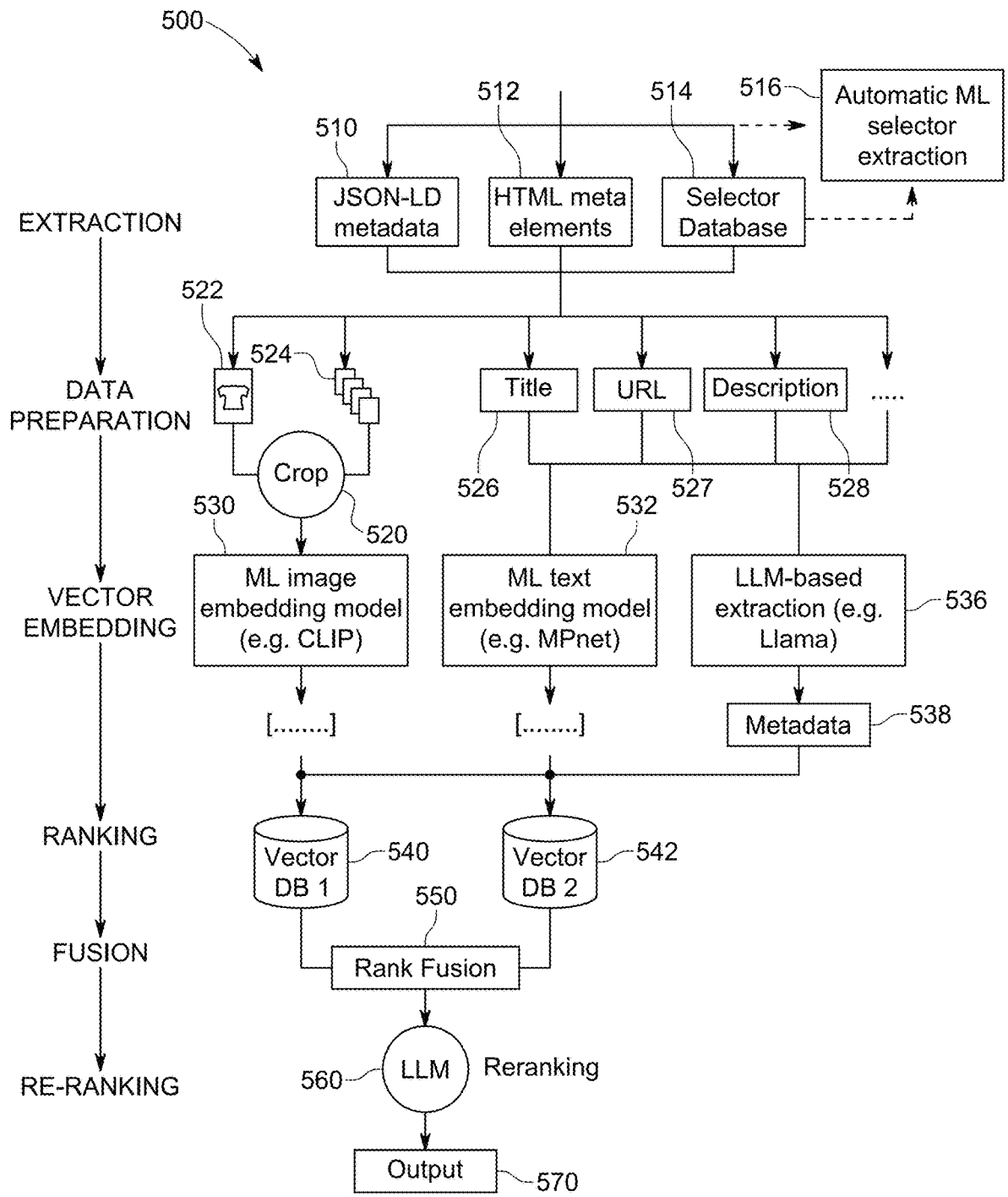
FIG. 5 is a flow diagram showing aspects of the search process in more detail, in accordance with aspects of this disclosure.

When user 101 is viewing retail goods on a seller website, application 110 (which may be implemented as browser extension 442 or as a standalone application, for example) detects user activity and initiates extraction step 402. Browser extension 442 scrapes relevant retail goods data directly from the webpage being viewed, including image URLs, titles, descriptions, sizes, colors, categories, and prices. With reference to FIG. 5, which is a flow diagram 500 showing certain aspects of search process 400 in more detail, extraction of retail goods data relies in some examples on JSON-LD metadata 510 and HTML meta elements 512, both of which are commonly used formats for embedding structured metadata within webpages.

To extract retail goods metadata efficiently, such as title 526, URL 527, etc., recommendation system 100 employs metadata heuristics that analyze the webpage's metadata structures. These heuristics combine extracted metadata from multiple sources into a unified, structured dataset. As shown in FIG. 4C, in some examples, browser extension 442 transmits the retail goods image data and collected metadata to search application programming interface (API) serverless container 444, which resides in cloud serverless architecture 104. Search API serverless container 444 serves as an intermediary that manages and processes incoming retail goods metadata before forwarding it to serverless machine learning (ML) inference API 446 for further processing.

In addition to heuristics-based extraction, recommendation system 100 may perform LLM-based extraction to process unstructured website content such as free-form retail goods descriptions 528 that are not embedded as structured metadata. With reference to FIG. 5, recommendation system 100 may use an LLM-based extraction component 536 employing models such as Llama-7B to transform unstructured content such as free-form retail goods descriptions 528 into structured metadata 538. LLM-based extraction component 536 may use a variety of techniques such as instruction-based prompting, few-shot prompting, and fine-tuning. Instruction-based prompting guides the LLM with carefully crafted prompts tailored for metadata extraction. Few-shot prompting improves the accuracy of the output by providing a set of well-chosen examples, while fine-tuning involves training the model further on domain-specific data, such as a curated dataset of example websites and JSON outputs. Cloud serverless infrastructure 104, via serverless ML inference API 446, facilitates the computationally intensive execution of these tasks, enabling scalable and efficient LLM inference.

To optimize extraction step 402, recommendation system 100 employs automatic ML selector or tag extraction component 516 (FIG. 5) to dynamically analyze the webpage's document object model (DOM), which is a hierarchical tree structure representing webpage elements such as HTML tags, attributes, and text. Through machine learning, component 516 identifies selectors, tags or identifiers—such as CSS (cascading style sheets) selectors and XPath queries—that target HTML tags containing the relevant retail goods metadata. CSS selectors allow system 100 to target HTML elements based on attributes like class names, IDs, or tag names. For example, the selector #price-box targets an element with the ID "price-box," while product-title identifies elements containing the class "product-title." XPath queries provide another method for traversing the DOM, allowing the system to identify elements based on their hierarchical relationships. For instance, the XPath query //div[@id='price-box'] targets a <div> element with the ID "price-box," and //img/@src extracts the src attribute of an <img> tag, which often contains the URL of an image.

Once the relevant selectors are identified, automatic ML selector extraction component 516 caches the selectors in selector database 514 for future use (FIG. 5). The cached selectors enable faster and more efficient metadata extraction during subsequent visits to the same or similar websites, bypassing the need for repeated DOM analysis. If a website's DOM structure changes—for instance, due to a redesign, new product listings, or regional variations—the cached selectors may no longer match the updated structure. In such cases, recommendation system 100 dynamically falls back to LLM-based extraction, with search API serverless container 444 delegating the task to serverless ML inference API 446, which reprocesses the webpage content using LLM models to generate updated selectors, which are then stored in selector database 514.

By combining heuristics-based metadata extraction, LLM-based metadata extraction, and automatic ML selector extraction and caching, recommendation system 100 provides a robust and scalable solution for extracting retail goods metadata. The output of extraction step 402 includes structured metadata and image data for the retail goods of interest that is then transmitted to application server 114 for data preparation step 404.

Search—Data Preparation Step 404

Data preparation step 404 first classifies the extracted retail goods metadata into an appropriate retail category. Classification into a retail category may use a combination of keyword heuristics and LLM-based classification. In some examples, LLM-based classification into a retail category is performed by serverless ML inference API 446, which resides within cloud serverless infrastructure 104 and executes LLMs to classify the extracted metadata into an appropriate retail goods category.

Data preparation step 404 also addresses the issue of extraneous content in images of retail goods and the issue of multiple images of retail goods. Retail goods image 522 (e.g., a shirt as shown in FIG. 5) may sometimes contain distracting image content other than just the retail good itself. With reference to FIG. 2, for example, where the retail good of relevance for the search is Morana coat 212, the outfit worn by the model contains additional items such as top 214 and handbag 216. Using the determined retail category, recommendation system 100 performs intelligent image cropping 520 to isolate the retail good of interest (e.g., Morana coat 212). In performing intelligent image cropping 520, application server 114 may invoke serverless ML inference API 446, which resides in cloud serverless infrastructure 104, to employ segmentation foundation models such as a segment anything model (SAM) or a grounding DINO model to analyze the image and generate a bounding box around the portion of the image corresponding to the retail good of interest. The cropped image, focused solely on the retail good of interest, improves the accuracy of downstream embedding and search processes. Leveraging the website context to first classify the retail good into a category is advantageous relative to purely image-based approaches such as Google Lens. Moreover, running the LLM models on cloud serverless architecture 104 advantageously reduces search latency.

Referring again to FIG. 5, in addition to a single image 522 containing multiple items, multiple and separate retail goods images 524 may be present on the page of the retail goods website that user 101 is viewing. With reference to FIG. 3, for example, while the retail good of interest is bat 262, retail goods website 260 includes additional and separate images of other retail goods such as glove 264 and helmet 266. Recommendation system 100 applies intelligent image cropping 520 to determine which of these multiple images 524 best represents the retail good of interest. Application server 114 may apply size and website heuristics to identify the most representative image, such as by selecting the largest image (bat 262) from among smaller thumbnails (glove 264 and helmet 266). Application server 114 may invoke serverless ML inference API 446 to perform intelligent image cropping and classification tasks using machine learning models hosted in cloud serverless infrastructure 104. In some embodiments, user 101 may manually assist this process by employing point-and-drag or lasso tools to select the image or image subsection that best illustrates the retail good of interest.

System 100 may also perform intelligent color detection to automatically identify the closest descriptive color word for a retail good, such as "rouge" or "burgundy" for a fashion piece. In some examples, to perform intelligent color detection, application server 114 interacts with serverless ML inference API 446 residing in cloud serverless infrastructure 104 to execute a combination of segmentation foundation models, clustering algorithms, and color space mapping techniques to analyze the retail good image, segment the relevant region, and map its pixel data to a descriptive color word.

Search—Vector Embedding Generation Step 406

Referring again to FIG. 4A, after data preparation step 404 is complete, recommendation system 100 proceeds to vector embedding generation step 406, where image and text data are transformed into vector embeddings. Vector embeddings are compact numerical representations that encode the key features of data in a multi-dimensional space, enabling efficient and accurate comparisons. The embeddings of step 406 are generated by machine learning models operating in cloud serverless infrastructure 104.

With reference to FIG. 5, vector embedding step 406 uses an ML image embedding model 530 such as a contrastive language-image pretraining (CLIP) model to process retail goods images and extract visual features. CLIP generates embeddings that align images with corresponding textual descriptions in a shared vector space. In a simplified example, an image of a red velvet dress might produce a vector such as [0.12, 0.85, 0.43, . . . ] representing visual attributes like shape, color, and material. Similarly, an image of a black leather boot might generate a vector like [0.03, 0.67, 0.91, . . . ] that encodes shape, color, and material. CLIP's ability to align visual and textual features allows recommendation system 100 to compare images to text, enabling cross-modal semantic searching. Vector embedding step 406 also employs an ML text embedding model or sentence transformer 532, such as MPNet, to process titles 526, URLs 527, descriptions 528, and other retail goods metadata to generate text embeddings that encode semantic meaning. In another simplified example, the title "red velvet dress" might map to a vector like [0.12, 0.86, 0.44, . . . ], while a description such as "black leather boots for winter" might produce a vector like [0.04, 0.68, 0.89, . . . ]. Text embedding models such as MPNet consider the context of the text, ensuring that semantically similar phrases, such as "wine red dress" and "burgundy velvet dress", are represented as closely related vectors in the embedding space.

In some examples, serverless ML inference API 446 (FIG. 4C), residing within cloud serverless infrastructure 104, implements image and text embedding models 530 and 532 to produce the vector embeddings. By combining image embeddings from ML image embedding model 530 and text embeddings from ML text embedding model 532, system 100 enables robust multimodal search functionality. For instance, if user 101 inputs the text query "red velvet dress", recommendation system 100 compares its embedding to the embeddings of stored resale goods images and descriptions to identify matches and similar items. Conversely, if user 101 uploads an image of a black leather boot, recommendation system 100 compares the image embedding to stored text and image embeddings to retrieve matching or similar resale goods.

To further enhance accuracy, image and text embedding models 530 and 532 may be fine-tuned specifically for the retail goods domain, or for a subset of the retail goods domain such as fashion-related goods, for example. Fine-tuning involves training models 530 and 532 on datasets tailored to the retail goods domain, which includes retail goods images, textual metadata, and detailed descriptions. This process allows the models to adapt their pre-trained knowledge to retail goods-specific features such as product categories, brands, materials, and colors. By refining how embeddings are generated, the models better capture the nuanced relationships between visual and textual data in the context of retail goods searches.

One approach to fine-tuning focuses on multi-modal alignment for the CLIP model, which aligns the embeddings of retail goods images and corresponding text descriptions into a shared vector space. For example, an image of a red velvet dress paired with its caption, such as "a luxurious red velvet dress with long sleeves," helps the model learn how visual attributes like color, texture, and shape correspond to textual descriptions. By training the model on retail goods-specific examples, multi-modal alignment ensures that key features are effectively represented in the vector embeddings and improves the model's ability to handle cross-modal comparisons, enabling text-based searches to retrieve relevant retail goods images and image-based inputs to identify corresponding textual data.

When labeled training data is limited, system 100 may generate synthetic captions from available retail goods metadata to create additional training pairs. Metadata, such as titles, descriptions, and attributes, can be transformed into natural language captions that describe the retail good. For example, metadata such as "SKU1234—Women's burgundy velvet dress, size M" may be converted into "A women's burgundy velvet dress in medium size." The synthetic captions are paired with the associated retail goods images to expand the fine-tuning dataset.

Another approach to fine-tuning is first-hand/second-hand vector alignment to ensure that embeddings for retail goods listings align closely with their corresponding resale goods counterparts. For example, a retail goods image of a red velvet dress may be compared to a resale goods listing with the description "pre-owned burgundy dress, gently used." Despite differences in image quality, phrasing, or contextual presentation, the fine-tuning process maps these embeddings closer together in the vector space. This alignment enhances the ability of system 100 to identify resale goods that match or resemble retail goods and bridges the gap between retail and resale platforms.

Through fine-tuning techniques such as multi-modal alignment, caption generation, and first-hand/second-hand vector alignment, the image and text embedding models 530 and 532 are optimized to generate embeddings that are highly accurate and domain-specific. These refined embeddings form the backbone of the semantic search capabilities of system 100, ensuring that retail goods searches—whether based on text or image inputs—produce precise and relevant results across both firsthand and resale markets.

Search—Ranking Step 408

Referring again to FIG. 4A, after retail goods vector embeddings have been generated in step 406, ranking step 408 identifies and ranks the most relevant search results from resale goods vector embeddings stored in vector database 450 (FIG. 4C). In some examples, vector database 450 may comprise separate image embedding and text embedding databases. See FIG. 5, for example, which shows vector database 540 of image embeddings (vector DB 1) and vector database 542 of text embeddings (vector DB 2). Vector database 450 (e.g., vector databases 540 and 542) is continuously updated as part of data pipeline preparation process 420, which generates embeddings for resale goods listings ingested from partner websites and other sources and will be described in more detail below. In the broader system architecture illustrated in FIG. 1, vector database 450 (e.g., vector databases 540 and 542) is represented by database 116.

When the search is initiated, application server 114 interacts with database 116, including its vector database components, to locate embeddings that are most similar to the query embeddings generated during embedding generation step 406. For an image-based search, query image embeddings, generated by the CLIP model within serverless ML inference API 446, are compared to resale goods image embeddings stored in vector databases 540 and 542. Similarly, for a text-based search, query text embeddings, produced by MPNet or another sentence transformer model, are compared to resale goods textual embeddings stored within vector databases 540 and 542. These comparisons rely on similarity metrics such as dot product or cosine similarity that determine how closely the query embeddings align with stored embeddings in the multi-dimensional vector space.

In addition to embedding-based comparisons, system 100 performs a full-text search on retail goods metadata, such as titles, descriptions, and attributes. This ensures that relevant results are identified when exact keyword matches occur, complementing the semantic retrieval provided by the embeddings. For example, a query for "red velvet dress" may match semantically similar descriptions, like "burgundy evening gown", while also surfacing exact matches that include the precise keywords in the metadata.

In some examples, in order to efficiently retrieve results at scale, application server 114 employs approximate nearest neighbor (ANN) search algorithms, such as the hierarchical navigable small worlds (HNSW) algorithm and the inverted file system (IVF) algorithm. The HNSW algorithm organizes embeddings into a graph structure that enables rapid traversal to locate the closest neighbors, significantly improving search performance. Similarly, the IVF algorithm partitions the vector space into distinct regions, allowing system 100 to focus the search on the most relevant partitions, thereby reducing computation time.

Once the closest vectors have been identified from vector databases 540 and 542, application server 114 applies a series of filters based on the extracted metadata, including attributes such as category, size, price, and brand. These filters refine the search results to ensure that they satisfy the user's query parameters. For instance, a query specifying a "women's red velvet dress under $100" will return only results that match the specified category, color, and price range. The ranking step processes multiple query inputs—whether from text, images, or a combination of both—and applies multiple filter sets simultaneously in parallel. This parallel processing generates multiple ranked result sets that are further consolidated in fusion and re-ranking step 410 into a single, final ranked list.

Search—Fusion and Re-Ranking Step 410

Fusion and re-ranking step 410 is the final stage of search process 400 in which the multiple result sets generated in ranking step 408 are consolidated and refined to generate an optimized list of matching secondhand items for user 101. Prior to step 410, recommendation system 100 performs up to three types of retrieval processes: image embedding retrieval, text embedding retrieval, and full-text search. Each of these retrieval methods produces a ranked list of potential search results, with associated numerical scores, from the continuously updated vector embeddings stored in vector database 450 (FIG. 4C), which corresponds to vector databases 540 and 542 of FIG. 5.

In the fusion portion of step 410, the separate ranked lists produced by the retrieval processes are merged into a single unified ranked list 550 (FIG. 5). In some examples, system 100 employs an algorithm such as the reciprocal rank fusion (RRF) algorithm, which computes a single score for each search result based on the reciprocals of its rank in each of the multiple ranked lists. In this manner, RRF prioritizes results that consistently rank highly across multiple retrieval methods. The fusion portion of step 410 aggregates search results from different retrieval processes, such as vector-based semantic search and full-text search, into a unified ranked list. In some examples, where only one retrieval method is used—such as just image embedding retrieval or just full-text search—the fusion step is not necessary. However, the subsequent re-ranking portion of step 410 still applies and is performed.

Once unified ranked list 550 is generated, the re-ranking portion of step 410 reorders list 550 with a higher fidelity model before presenting the results to user 101. The re-ranked list forms the output (search result) 480 that is displayed in user interface 103 in the form of, in some examples, potential matching resale goods 232, 282 in sidebars 230, 280 (FIGS. 2-3). Re-ranking is performed using a combination of heuristics-based re-ranking, ML language model-based re-ranking, and preference-aware re-ranking. These re-ranking processes are implemented by application server 114 and by cloud serverless infrastructure 104 via serverless ML inference API 446.

In heuristics-based re-ranking, application server 114 applies multiple heuristics to give "ranking boosts" to resale goods that are considered particularly relevant to a given user and/or search query. Some non-limiting examples of such heuristics include price-based boosting, brand-based boosting, and condition-based boosting. In price-based boosting, the ranking of more affordable resale goods is boosted. In brand-based boosting, recognizing that users often prefer brand over visual similarity, the target retail brand that the user is searching for (as determined in website extraction step 402) is boosted. In condition-based boosting, resale goods that are in better condition are given a boosted ranking. These heuristic adjustments re-rank the search results to reflect general user expectations and preferences.

ML language model-based re-ranking further refines the search results. In some examples, a mid-sized LLM 560 (FIG. 5), such as a model based on Llama or GPT architecture, is used in ML language model-based re-ranking. Re-ranking LLM 560 may be implemented, for example, by serverless ML inference API 446 residing in cloud serverless infrastructure 104. As shown in FIG. 5, re-ranking LLM 560 re-ranks the unified list 550 generated in the fusion portion of step 410 to generate the re-ranked and final output 570. Language model 560 performs several critical tasks, including without limitation: (1) filtering out outliers that have not yet been recognized; (2) balancing the search results, such as to prevent clusters of visually similar items from dominating the final list; and (3) aligning the order of results with common user preferences and trade-offs involved in prioritizing factors such as color, brand, material, price, etc. Such common user preferences and trade-offs can be encoded in the re-ranking model by prompting LLM 560. In some examples, LLM 560 is fine-tuned for re-ranking step 410 by use of human labeling and by collecting user behavior data such as click data and purchase conversion data.

The preference-aware re-ranking component of fusion and re-ranking step 410 personalizes the search to a particular user by prompting LLM 560 to incorporate qualitative preferences input by that user. That is, LLM 560 is configured to dynamically adjust the re-ranking based on preference-aware inputs by user 101. For example, user 101 may input preferences such as how they value trade-offs between condition and price, color and visual similarity versus brand, and so on. Recommendation application 110 may suitably configure user interface 103 to accept user input of preferences, such as by allowing free-form natural language input by user 101 and/or by obtaining form-based input from user 101. In the case of free-form natural language input, user 101 describes their preferences in their own words. For example, user 101 may write a brief sentence such as "Today, I care that my clothing has the same material but I don't care about color, and I am only interested in premium brands in about the same price range". This allows for fine-grained incorporation of a user's preferences in a way that is not possible using classical filters. In a form-based user interface, user 101 may dial in their preferences across common axes such as by using sliders or toggles.

User preference inputs obtained in this fashion are combined and encoded into a natural language preference prompt that is provided to LLM 560 during re-ranking. Thus, through a combination of ranking fusion, heuristics-based re-ranking, language model-based re-ranking, and preference-aware re-ranking, fusion and re-ranking step 410 delivers a highly refined and personalized search result list, which application 110 may display in user interface 103 via a browser extension, standalone app, mobile app, etc. Results may be displayed in various formats, including lists, grids, or dropdown menus, and each resale good listed in the results may include details such as an image, price, and a hyperlink to the seller.

In some embodiments, system 100 may display differentiators indicating whether a resale good is secondhand, deadstock, overstock, or other relevant category. Results can also be filtered or prioritized based on these categories to enable further refinement by user 101. By default, resale goods priced higher than the corresponding retail good may be excluded; however, exceptions may be made when the subject retail good is sold out or has limited stock, in which case all available resale goods options may be shown. User 101 may interact with the displayed results to provide valuable feedback. For example, user 101 may specify whether a search result was an exact match, a suitable match, or a preferred alternative. Such feedback may transmitted to application server 114, logged in database 116, and indexed and stored for future use. Matches may be labeled as successful or unsuccessful, enabling system 100 to periodically re-run searches for unsuccessful queries to identify new matches as additional inventory becomes available. Logged user feedback, including selected matches and tracked purchases, is further used to refine and train recommendation system 100.

Data Pipeline Preparation

Preparation and maintenance of a data pipeline that provides a diverse and up-to-date collection of resale goods to recommendation system 100 is continuous and ongoing. The primary objective of data pipeline preparation process 420 (FIG. 4B) is to load a diverse catalog of resale goods, process the resale goods data using machine learning, and then ingest the resale goods into a search index that is ready to be queried in real time by users via search process 400. Data pipeline preparation involves dealing with hundreds of millions of resale goods that, as opposed to most firsthand goods for example, have individually unique attributes such as condition, price, seller, etc. Moreover, the catalog of resale goods is highly dynamic, with new resale goods being listed, existing resale goods being sold, and prices being updated on a daily or even hourly basis. For these reasons, data pipeline preparation process 420 is a continuously running process, with most steps running on a configurable basis, such as daily or hourly.

Data pipeline preparation process 420 is a multi-step process that is illustrated in FIG. 4B. In step 422, resale goods inventory data are loaded from partner websites and/or other sources and parsed. In step 424, a combination of heuristics and LLM-based approaches are applied to clean the data, including bringing the data into a common categorization scheme and filling in missing fields. Step 426 of inventory management involves maintenance of a resale goods data warehouse and continuous tracking of inventory changes. In step 428, the cleaned and categorized resale goods inventory data is converted into vector embeddings and ingested into the vector database.

Data Pipeline—Data Loading Step 422

Data loading step 422, as part of recommendation system 100 (FIG. 1), comprises loading resale goods inventory data from a variety of sources into cloud serverless infrastructure 104, where it is prepared for downstream processing. The resale goods inventory data may be provided through multiple provisioning methods such as partner application programming interfaces (APIs) 461 (FIG. 4C); file transfer protocol (FTP) servers, and cloud storage, and may come in a variety of schemas and formats such as extensible markup language (XML), JavaScript object notation (JSON), and comma-separated values (CSV).

In some embodiments, resale goods inventory data is loaded from select partner websites that allow users to list resale goods for resale. In some examples, to standardize the diverse data provisioning methods (e.g., FTP, API, cloud storage) and schemas (e.g., XML, JSON, CSV) that may be used by its partners, system 100 implements a custom loading adapter for each partner. Each loading adapter is configured to understand a partner's unique schema and to convert the incoming data from that partner into a unified format. In some implementations, the unified format is a JSON schema defined to cover all relevant types of metadata associated with resale goods from partner websites.

In some examples, as can be seen in FIG. 4C, loading adapters may be implemented by components 462 such as Google cloud functions and virtual machines (VMs) that operate within cloud serverless infrastructure 104 and interface with partner APIs 461. In the context of data preparation step 424, Google cloud functions are serverless, event-driven compute services that execute tasks without requiring the management of infrastructure. They may be used for triggering rule-based mappings, running small ML-based processes, or orchestrating different steps of the data pipeline. Virtual machines (VMs) are provided by a cloud service provider (such as Google Cloud, AWS, and Azure) and provide more extensive computational capacity for tasks that require additional resources, such as executing ML models or managing large-scale data transformations. Together, Google cloud functions & VMs 462 enable scalable execution of rule-based and ML-based tasks required for data loading step 422 and data cleaning step 424.

The output of data loading step 422, which in some examples comprises converted JSON output, is stored in cloud storage buckets 464 within cloud serverless infrastructure 104 before being further processed. Cloud storage buckets 464 act as an efficient and scalable repository for the converted JSON output of data loading step 422, enabling its seamless progression through the data pipeline and making it available for data cleaning step 424. System 100 schedules the loading adapters, implemented by components 462 that operate within cloud serverless infrastructure 104, to run on a basis that is configurable to each partner's update frequency. For example, loading adapters may run at hourly, daily, or other intervals based on how frequently each partner updates its data feed. This continuous data loading ensures that the most up-to-date resale goods inventory is loaded and stored in recommendation system 100 for further processing, including eventual ingestion into vector database 450 (FIG. 4C).

Data Pipeline—Data Cleaning Step 424

In data cleaning step 424, recommendation system 100 applies a combination of rule-based heuristics and ML-based approaches to clean the resale goods inventory data loaded in step 422. Cloud based components 462 residing in cloud serverless infrastructure 104 provide a scalable computational environment for performing data cleaning step 424. Data cleaning step 424 ensures that metadata from different sources and partners is homogenized and brought into a standardized schema, and that any missing fields are filled in. In this regard, even after data from various partners has been converted into a unified format in data loading step 422, inherent heterogeneity in that metadata persists.

Resale goods partners and other sources of resale goods inventory often use inconsistent taxonomies and/or standards in their metadata fields, such as different clothing size standards and different taxonomies for category, color, condition, etc. Moreover, different partners send different subsets of metadata, so some important fields may be missing. To address this, data cleaning step 424 resolves discrepancies using a rule-based mapping, in which metadata provided by resale goods partners (partner taxonomy) is mapped to a standardized taxonomy. The standardized taxonomy covers relevant metadata fields such as category, color, condition, and size.

In instances where rule-based mapping is not effective, data cleaning step 424 employs ML-based tagging to infer the correct metadata values in a standardized taxonomy. ML-based tagging is facilitated by cloud-based components 462 residing in cloud serverless infrastructure 104. Examples of situations in which rule-based mapping is not effective include where fields are missing entirely, such as when a partner does not provide a category field, and where there are user-generated free-form fields, such as when a partner website allows input of fields such as category or color in a free form way, resulting in a long tail of potential values that cannot be enumerated in a single mapping. For example, partners may allow users to input metadata fields like color or category in non-standardized free-form text, which varies significantly across entries. To address these issues, machine learning implemented by components residing in cloud serverless infrastructure 104 is used to infer and tag the correct metadata values in the standardized taxonomy. In some examples, a small language model based on architectures such as BERT (Bidirectional Encoder Representations from Transformers) or Llama is tuned for this metadata tagging use case. The inputs to the ML model include the title and description of the resale good and, if available, the user-generated non-standardized value for the field in question. By processing these inputs, the ML model predicts and assigns the most appropriate value in the standardized taxonomy, ensuring the metadata is both complete and consistent.

In some embodiments, ML-based aspects of data cleaning step 424 are optimized by implementing key value (kv)-caching to reduce costs. Caching frequently encountered inputs and their corresponding outputs avoids redundant computations and minimizes resource usage associated with running ML models. For instance, once an ML model has tagged a specific free-form value like "deep red" as corresponding to the standardized value "burgundy," the result can be cached and reused for similar inputs encountered in subsequent data processing.

Data Pipeline—Inventory Management Step 426

Once data cleaning step 424 is complete, the loaded and cleaned metadata is stored in a standardized format such as JSON files in cloud storage 464, serving as an input to subsequent inventory management step 426. In inventory management step 426, the loaded and cleaned data is stored in resale goods data warehouse 466 residing in serverless cloud infrastructure 104. In some examples, data warehouse 466 is implemented by BigQuery, which is a fully managed, serverless, cloud-based data warehouse and analytics platform provided by Google Cloud. It enables organizations to store, manage, and analyze large-scale datasets efficiently without the need for infrastructure management, and is particularly optimized for performing complex queries on massive datasets with high speed and scalability.

Data warehouse 466 is optimized for batch processing and historical analysis rather than real-time queries. In this regard, inventory management step 426 performs multiple functions to ensure that the search index remains accurate and up-to-date while minimizing computational costs associated with ingesting data into the search index. Step 426 maintains a historical record in data warehouse 466 of all resale goods that have ever been included in the search index, including sold-out items. This historical record enables tracking of inventory changes over time and facilitates business analytics, such as analyzing price trends, demand curves across different brands and categories, and other metrics.

In furtherance of keeping the search index accurate and up-to-date, and selecting which resale goods data should be added to and removed from the search index, inventory management step 426 executes a search inventory selection query on a regular, configurable basis, such as hourly. The search inventory selection query selects which resale goods are sold-out or unlisted and should be removed from the search index, and which resale goods are newly listed and should be added to or updated in the search index. As structured query language (SQL) is the standard language for querying structured data and interacting with databases, in some examples, the search inventory selection query is advantageously implemented as a BigQuery SQL query. Inventory management step 426 also performs quality filtering to exclude low quality resale goods and to ensure that only high quality resale goods are ingested into the search index. Quality filtering may be implemented, for example, by heuristics based on the resale goods condition, price, and the completeness of associated metadata.

Data Pipeline—Ingestion Step 428

Ingestion step 428 comprises generating image and text embeddings for each resale good in the resale goods inventory and ingesting these embeddings into the search index for real-time search queries. Step 428 is the most computationally intensive part of data pipeline preparation process 420 due to the large volume of resale goods inventory data and the computational demands of the embedding process.

Embedding generation begins with the CLIP model and follows the domain-specific fine-tuning previously described in the context of search process 400. Specifically, embeddings for resale goods images and corresponding textual metadata (e.g., titles and descriptions) are generated using the fine-tuned CLIP model for images and a sentence transformer, such as MPNet, for text. The image embeddings ensure semantic understanding of visual features, while text embeddings capture semantic meaning from titles and descriptions. To perform these computations efficiently and at scale, recommendation system 100 utilizes a serverless GPU provider, shown as element 468 in FIG. 4C, within cloud serverless infrastructure 104 (FIG. 1). Serverless GPU providers offer dynamic provisioning of GPU resources for on-demand execution of machine learning workloads.

In one implementation, a Kubernetes-based system is used to orchestrate the distributed GPU-based batch processing jobs required for embedding generation. Kubernetes serves as a container orchestration platform that allows system 100 to distribute compute workloads across multiple GPU instances in parallel. The Kubernetes-based implementation is hosted within cloud serverless infrastructure 104 and operates on top of serverless GPU resources 468. The parallelized processing reduces latency and ensures that embeddings for the continuously changing resale goods inventory are generated efficiently, even when dealing with hundreds of millions of resale goods. The resulting embeddings may be temporarily stored within cloud storage buckets before being ingested into the search index.

Ingestion into the search index is managed by application server 114 (FIG. 1), which coordinates the final steps of embedding ingestion and ensures the search index remains up to date. The search index comprises two main components: vector database 450 for embedding-based searching and a search engine for full-text searching. In the broad system architecture shown in FIG. 1, vector database 450 is represented by database 116. Vector database 450 stores the image and text embeddings generated in the embedding generation process. In some examples, vector database 450 is a Pinecone database, which is a managed vector database designed for high-performance, low-latency (sub-100 ms) similarity searches across large datasets of vector embeddings. It implements approximate nearest neighbors (ANN) search techniques, such as the hierarchical navigable small worlds (HNSW) algorithm, which efficiently retrieves the top N closest matches for a given query.

Ingesting data into vector database 450 involves several considerations to ensure performance and scalability, particularly when incorporating metadata filtering capabilities into the search process. The "cardinality" of metadata fields refers to the number of unique values that a specific metadata field (e.g., size, brand, category) can contain. For example, a metadata field like "color" might have low cardinality if it contains only a limited number of unique values such as "red," "blue," and "green." In contrast, a field like "product ID" or "SKU" can have extremely high cardinality, as it contains unique values for every individual resale good. Maintaining low cardinality is critical because it reduces the complexity of metadata filtering during real-time search queries. When metadata fields have a high number of unique values, filtering becomes computationally expensive, slowing down the search process. High cardinality also complicates the ingestion step because the system needs to index a greater number of distinct metadata values, which increases both processing time and storage requirements.

To optimize performance, in some examples, metadata may be organized into shards during ingestion. A shard is a subset of the data stored in vector database 450 that contains a portion of the overall metadata. Sharding allows the data to be distributed across multiple database instances (e.g., pods or replicas), enabling parallel processing and improving query performance. For example, a vector database like Pinecone divides the search index into multiple shards based on the metadata field, ensuring that queries can be executed efficiently across distributed resources. Careful management of the cardinality of metadata fields through robust data cleaning processes (i.e., data cleaning step 424) and strategic use of sharding helps to optimize vector database 450 and data ingestion step 428. This is particularly important where metadata filtering is performed, such as restricting search results to a specific size, brand, category, etc. Well-structured shards allow queries to be executed quickly without overloading system 100.

In addition to vector embedding ingestion, system 100 supports full-text search by ingesting textual metadata into a classic search engine. In some examples, the search engine is implemented by Elasticsearch, which uses text-based search algorithms such as the BM25 bag-of-words model to allow text-based searching across titles and descriptions in the resale goods inventory data. Elasticsearch also allows for granular metadata filtering and full-text query handling.

Ingestion step 428 concludes with the embeddings and metadata being stored in vector database 450 and the full-text search engine. These components collectively form the catalog of resale goods available for real-time search queries. This catalog supports multiple retrieval types—image embedding retrieval, text embedding retrieval, and full-text search—which are executed in parallel during search operations. These retrieval processes generate ranked result sets, which are subsequently merged and re-ranked using the fusion and re-ranking techniques described previously.

Figure 6:
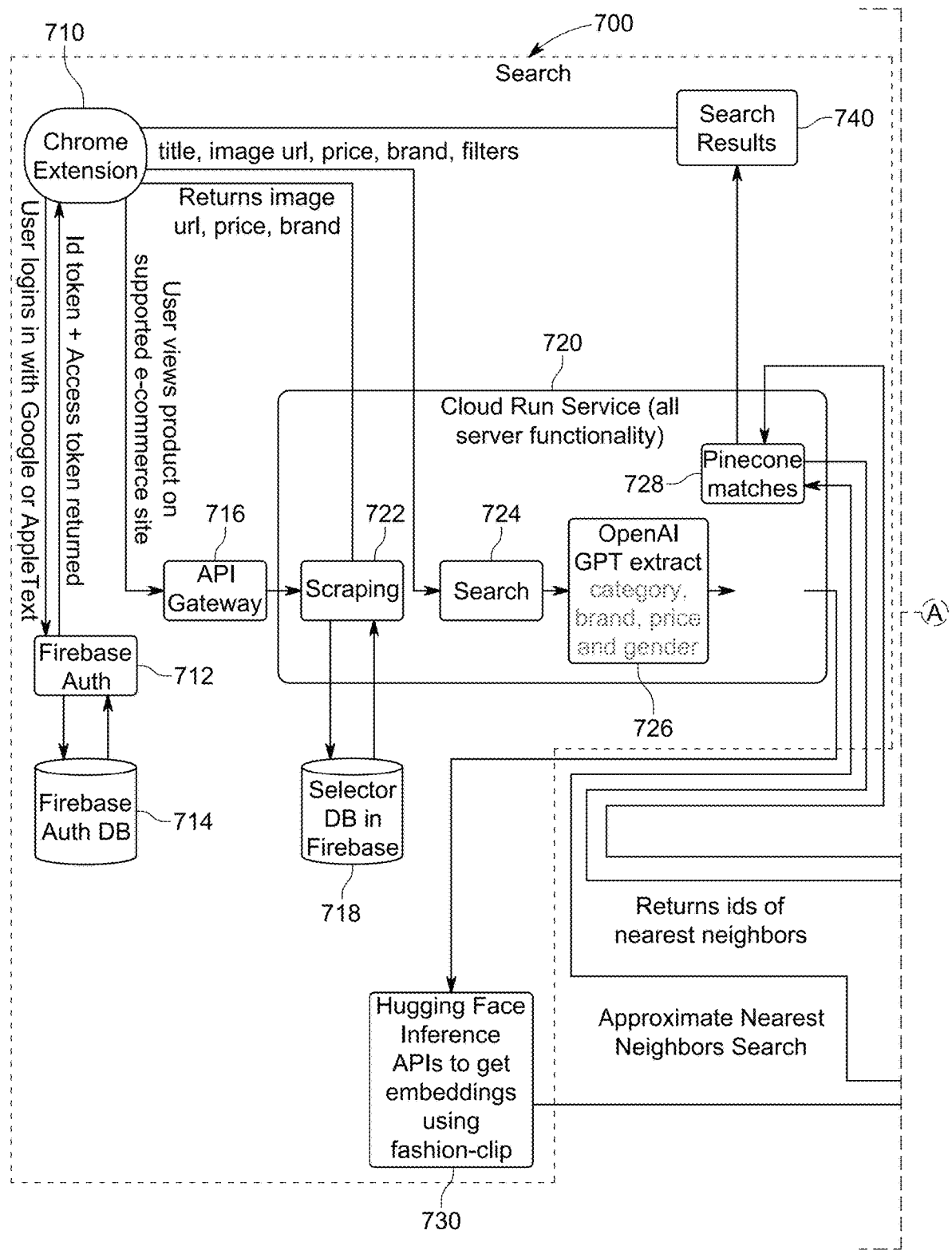
FIG. 6 is a block diagram illustrating an implementation example of the recommendation system, in accordance with aspects of this disclosure.
Figure 6:
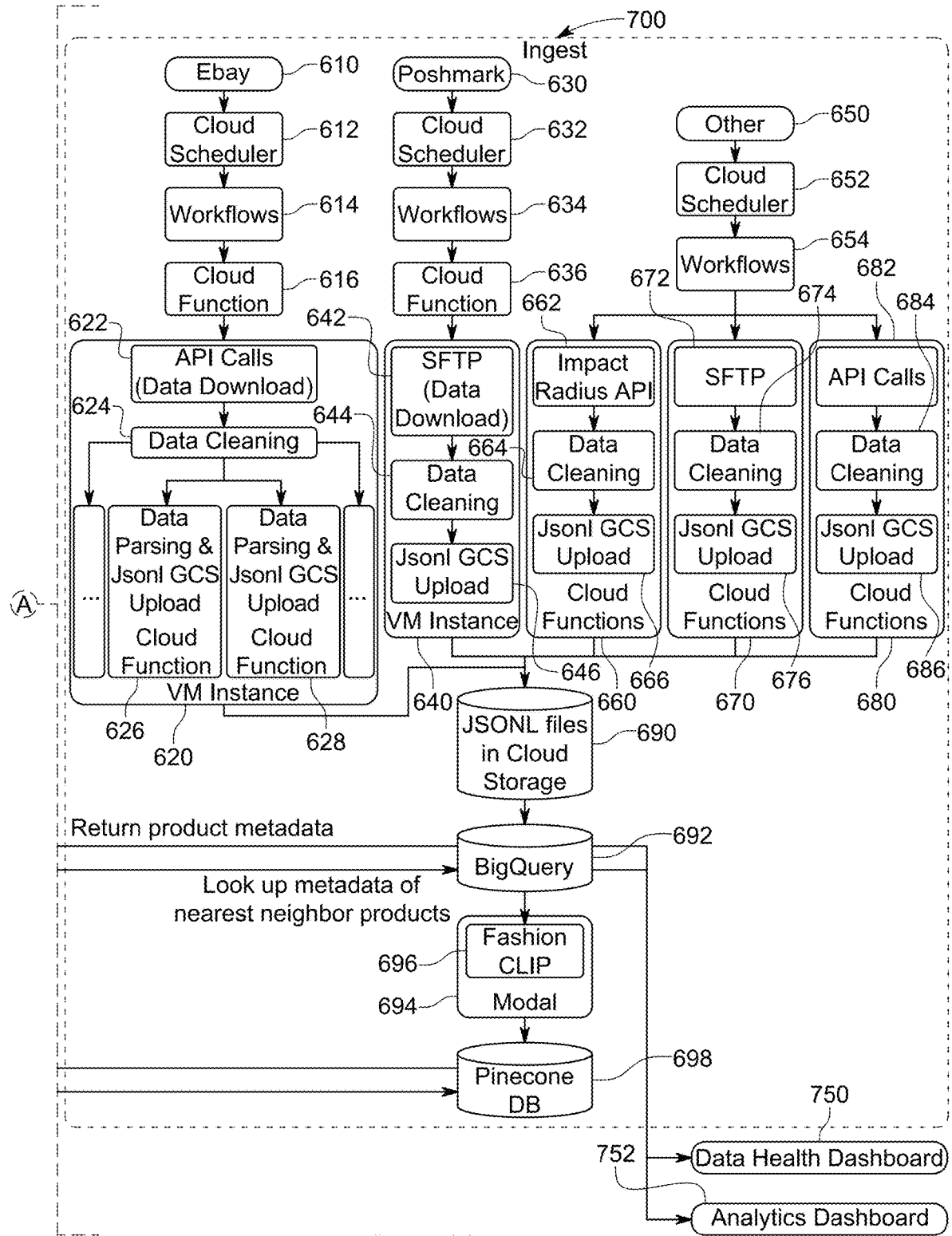

FIG. 6 is a block diagram illustrating an implementation example of recommendation system 100, which integrates both search process 400 and data pipeline preparation process (ingestion) 420. FIG. 6 demonstrates how data is ingested from multiple sources, processed, and stored for subsequent real-time search queries, and also illustrates the flow of a search request initiated by a user through recommendation system 100. FIG. 6 is divided into two main sections: ingestion (data pipeline) section 600 on the right side of the diagram and search section 700 on the left side of the diagram.

The ingestion or data pipeline preparation process ingests resale goods inventory and data from partners represented by Ebay partner 610, Poshmark partner 630, and other partner sources 650. These partner sources are non-limiting examples of resale goods platforms. Data from these partner sources is provided via a variety of methods, including API calls, SFTP servers, and cloud storage workflows. Each partner's data source is processed independently, ensuring that system 100 can handle their different provisioning formats and data schema. This portion of the ingestion process corresponds to data loading step 422 of data pipeline preparation process 400 (FIG. 4B), and is implemented by cloud serverless infrastructure 104 and application server 114 (FIG. 1).

For Ebay partner 610, the data pipeline preparation process begins with cloud scheduler 612, which triggers data ingestion on a configurable schedule, such as hourly or daily. Workflows block 614 orchestrates a sequence of tasks, including data loading and cleaning. Data is downloaded through API calls 622. Cloud functions 616 are invoked to process the downloaded resale goods data, including cleaning and unifying metadata fields such as category, condition, and price. Once the resale goods data is downloaded by API calls 622, it proceeds to data cleaning stage 624, where rule-based mapping and ML-based tagging (previously described with respect to data cleaning step 424) are applied to standardize the metadata and to infer missing fields. The cleaned data is then passed through data parsing and JSON GCS upload blocks 626 and 628, where the cleaned data is converted into a unified JSON schema and uploaded to JSON files in cloud storage 690 within cloud serverless infrastructure 104. VM (virtual machine) instance block 620 surrounding components 622, 624, 626, 628 indicates that virtual machines are used to execute data processing tasks such as parsing, cleaning, and uploading. This ensures the availability of dedicated computing resources for handling large data volumes efficiently.

The ingestion workflow for Poshmark partner 630 follows a similar structure. Cloud scheduler 632 triggers workflows block 634 to coordinate ingestion tasks. Resale goods data is retrieved from Poshmark's systems via SFTP 642, where data files are securely transferred to system 100. Cloud functions 636 are invoked to process the downloaded resale goods data, including cleaning and unifying metadata fields. Once the data is downloaded by SFTP 642, it proceeds to data cleaning stage 644, and then to data parsing and JSON GCS upload block 646, where the cleaned data is converted into a unified JSON schema and uploaded to JSON files in cloud storage 690 within cloud serverless infrastructure 104. Similar to the Ebay workflow, VM instance block 640 encloses the components responsible for performing data cleaning, parsing, and uploading tasks, indicating that these steps are performed by virtual machines such that the system can process large datasets efficiently and reliably.

Other partners 650 represent other partner sources that may follow alternative data provisioning and formatting methods. Each flow is managed independently using cloud functions 660, 670, 680 tailored to specific partner requirements. For each workflow, cloud scheduler 652 triggers workflow block 654 to coordinate ingestion tasks. In workflow 660, resale goods data is retrieved via impact radius API 662, which enables API-based downloading of metadata and inventory details. The data is cleaned at 664 and then transformed to the standardized JSON schema and uploaded to cloud storage at 666. In workflow 670, resale goods data is retrieved via SFTP 672, cleaned at 674, and then transformed to the standardized JSON schema and uploaded to cloud storage at 676. In workflow 680, additional partners provide resale goods data via API calls 682, the data is cleaned at 684, and then transformed to the standardized JSON schema and uploaded to cloud storage at 686.

After the data loading and cleaning workflows for Ebay, Poshmark, and other partners, the cleaned and unified data is stored in cloud storage buckets 690 as JSON files. Next, in inventory management step 426, the loaded and cleaned resale goods data is stored in resale goods data warehouse (BigQuery) 692 as previously described. Data ingestion step 428 is then performed, in which an ML model 694 including CLIP model 696 (which may be fine-tuned for retail goods or subsets of retail goods such as fashion-related goods) generates vector embeddings for both image and text data. As described above, a Kubernetes-based system may be used to orchestrate the distributed GPU-based batch processing jobs required for embedding generation. The generated embeddings are ingested into Pinecone vector database 698 (corresponding to vector database 450 of FIG. 4C), which is designed for high-performance, low-latency similarity searching across large datasets of vector embeddings. It implements approximate nearest neighbors (ANN) search techniques, such as the hierarchical navigable small worlds (HNSW) algorithm, which efficiently retrieves the top N closest matches for a given query.

The search process, depicted by block 700 on the left side of FIG. 6, begins when a user interacts with recommendation system 100 through application 110, which may be implemented as a browser extension such as Chrome extension 710 (as depicted), or as a standalone application, mobile app, or other implementation. Browser extension 710 of FIG. 6 corresponds to browser extension 442 of FIG. 4C. Firebase authentication 712 is provided to authenticate users accessing system 100. User credentials and session data are managed in Firebase authentication database 714, ensuring secure and reliable authentication. In some examples, when user 101 interacts with Chrome extension 710, they are prompted to log in using a third-party identity provider such as Google or Apple. Chrome extension 710 sends the authentication request to Firebase authentication 712, which facilitates the login process by redirecting the user to the chosen identity provider. Upon successful verification, Firebase authentication 712 generates an ID token containing user identity information like their user ID and email and an access token used for authorizing API requests. These tokens are returned to Chrome extension 710, which securely stores them for subsequent authenticated requests to components of system 100, such as accessing search results or saved preferences.

As previously described, browser extension or application 710 may automatically detect when user 101 is viewing or interacting with a product on a retail goods website, such as retail goods 212 (e.g., a Morana coat) on retail goods website 210 of FIG. 2. User interactions such as clicking on retail goods images, interacting with a search window, or spending a designated amount of time on website 210 serve as the basis for browser extension 710 initiating a search for matching or similar resale goods. The search request, comprising the retail good being viewed by the user, flows through API gateway 716, which corresponds to search API serverless container 444 of FIG. 4C and serves as the entry point for processing incoming search queries. API gateway 716 communicates with cloud run service 720 residing in cloud serverless infrastructure 104, which provides core serverless search functionalities, such as initiating search queries and retrieving matches.

As described with respect to extraction step 402, scraping service 722 scrapes relevant retail goods metadata from the webpage being viewed, including title, image URL, price, brand, etc. This may include use of metadata heuristics, LLM-based extraction for free-form product descriptions, and cached selectors in selector database 718. This information is returned to browser extension or application 710, which initiates the search 724. Data preparation step 404 is performed by cloud run service 720, such as by utilizing OpenAI GPT 726 in some examples. Vector embedding generation step 406 may be performed at block 730 (corresponding to ML inference API 446 of FIG. 4C) using Hugging Face inference APIs to generate embeddings from the prepared data using a CLIP model fine-tuned for retail goods, or a subset of retail goods such as fashion items, as described above. Once the retail goods embeddings are generated, they are sent to vector (Pinecone) database 698 which stores the embeddings of resale goods that were previously generated during the data pipeline and ingestion process. Vector database 698 uses approximate nearest neighbor (ANN) algorithms to identify the top N resale goods embeddings in database 698 that are closest to the query embeddings.

Vector database 698 returns the IDs of the N nearest neighbors as matches to cloud run service 720 (e.g., Pinecone matches 728) as part of ranking step 408. As described with respect to ranking step 408, multiple query inputs may be sent to vector database 698 and processed simultaneously in parallel to generate multiple ranked result sets. In the fusion portion of fusion and re-ranking step 410, the separate ranked lists are merged into a single unified ranked list 550 (FIG. 5) by cloud run service 720, which may be implemented as serverless ML inference API residing in cloud serverless infrastructure 104. As described above, the re-ranking portion of step 410 may apply a combination of heuristics-based re-ranking, ML language model-based re-ranking, and preference-aware re-ranking to generate search results 740. Search results 740 is a highly refined and personalized search result list that may be displayed by browser extension 710 in a sidebar or the like. In some examples, as illustrated in FIGS. 2-3, potential matching items 232, 282 are presented in browser extension sidebars 230, 280.

Data health dashboard 750 and analytics dashboard 752 provide data monitoring and analytical capabilities for recommendation system 100. Data health dashboard 750 interfaces with resale goods data warehouse (BigQuery) 692 and monitors the health, integrity, and quality of resale goods data processed through the ingestion pipeline. It tracks and flags issues such as incomplete metadata, missing fields, or inconsistencies that may arise from partner-provided data sources, including APIs, SFTP, or cloud storage feeds. By analyzing outputs from the ingestion workflows, including rule-based mapping and ML-based tagging, data health dashboard 750 identifies anomalies in real time and ensures that the processed data meets the required standards for downstream processes such as embedding generation and ingestion into the search index.

Analytics dashboard 752 also interfaces with resale goods data warehouse 692 and provides advanced analytics such as inventory trends, partner performance, and search behavior to facilitate optimization of recommendation system 100. For example, analytics dashboard 752 may analyze the volume of new, sold-out, or updated items ingested into the system and track category-specific demand curves, price trends, and item availability across partner platforms. Analytics dashboard 752 may also monitor query success rates, latency, and user behavior metrics such as click-through rates and purchase conversions.

Figure 7:
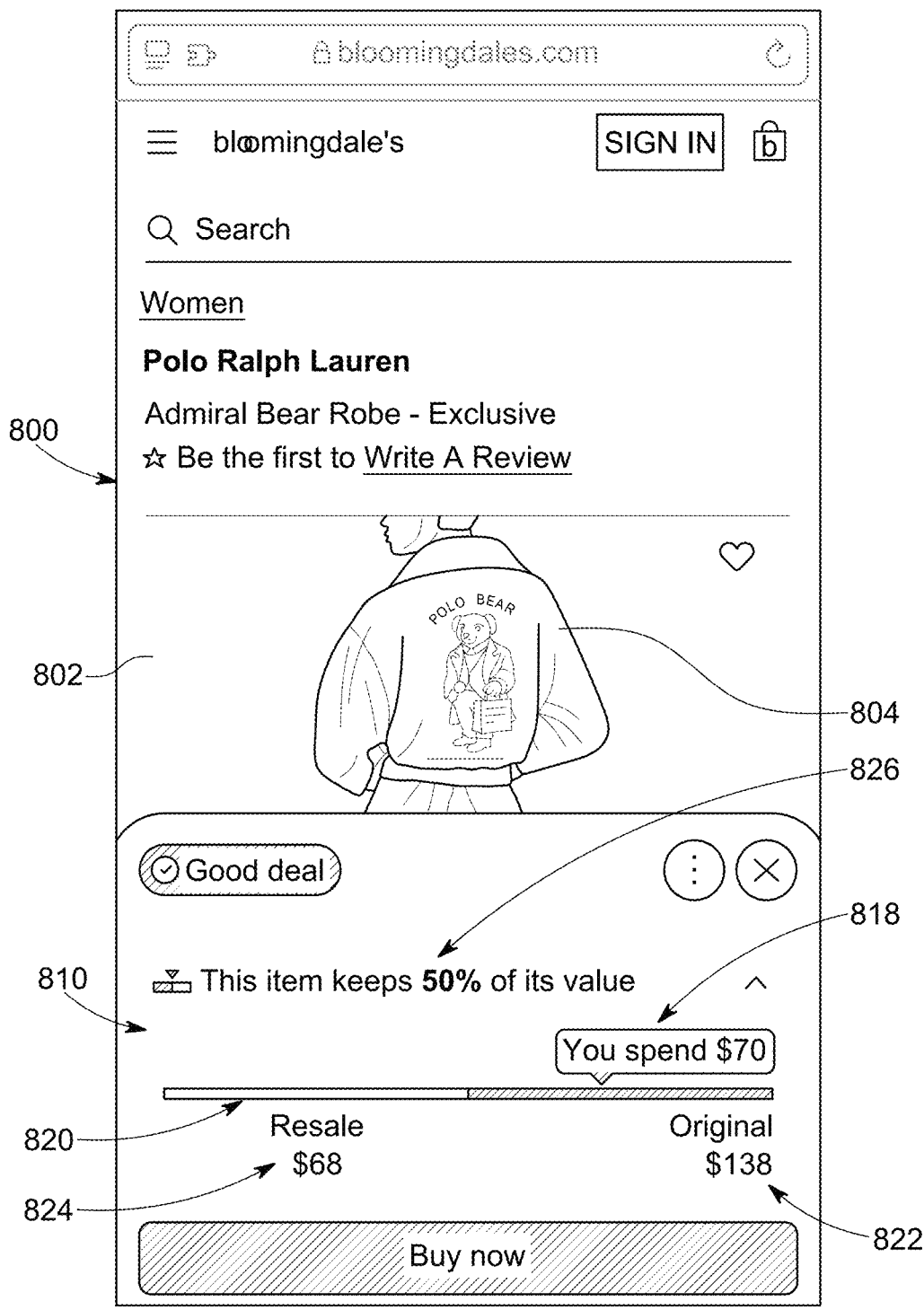
FIG. 7 is a screenshot of an exemplary user interface for an alternative embodiment of the recommendation system, in accordance with aspects of this disclosure.

FIG. 7 is a screenshot 800 of an alternative or additional embodiment of recommendation system 100, in which an estimate of the resale value of a retail good being viewed on a retail website or application is provided, in accordance with aspects of this disclosure. In the embodiment of FIG. 7, recommendation system 100 calculates and displays resale value information to inform user 101 of the financial implications of purchasing the retail (firsthand) good versus seeking a similar resale good through resale channels.

In the embodiment of FIG. 7, recommendation system 100 may be implemented via application 110 as a browser extension, standalone application, mobile app, or as an integrated feature of the retailer's website. For example, as shown in FIG. 7, recommendation application 110 generates a user interface 810 that overlays a retail goods website 802 (e.g., Bloomingdale's) where user 101 is viewing a retail good 804 (e.g., a Polo Ralph Lauren robe). In some examples, user interface 810 incorporates a value comparison bar 820 that provides real-time, data-driven insights into the resale value of the retail good 804 being viewed.

Value comparison bar 820 visually compares the retail price of the retail good 804 being viewed with its estimated retail value. In particular, value comparison bar 820 displays the retail price 822 of retail good 804, as obtained from retail goods website 802; the estimated resale price 824, calculated by recommendation system 100 using historical sales data and real-time listings as described below; the resale retention percentage 826, which quantifies the value retained by retail good 804 in the resale market relative to its retail price 822; and the price difference 818, which indicates how much extra user 101 would spend to purchase retail good 804 at its full retail price 822 versus acquiring it as a resale item.

Recommendation system 100 calculates resale price 824 using two approaches. First, for resale goods with sufficient historical data, system 100 collects resale prices of identical or highly similar items from multiple resale goods marketplaces (eBay, Poshmark, etc.) and calculates an average resale value. Second, for items lacking sufficient item-specific data, system 100 determines a brand-specific resale retention percentage 826 by analyzing the resale performance of multiple items from the same brand. This percentage is then applied to the original retail price 822 of retail good 804 to estimate its resale value 824. in both approaches, the estimated resale value 824 is further adjusted based on factors such as item condition, popularity, and market demand. The estimated resale value 824 and associated metrics are calculated and displayed in user interface 810 in real time as user 101 browses retail goods website 802. Resale goods data that is loaded and stored during data pipeline preparation process 820 (such as from vector database 450) may be leveraged to generate the estimated resale price 824 and resale retention percentage 826 shown in FIG. 7.

By integrating the functionality illustrated in FIG. 7 into the browsing experience, recommendation system 100 assists user decision-making by facilitating direct comparisons between retail and resale value. Additionally, this embodiment demonstrates the versatility of recommendation system 100 in adapting its core functionality to different user needs and shopping contexts. Recommendation system 100 may provide user interface 810 for estimating the resale value of retail goods in addition to providing a user interface presenting listings of matching or similar resale goods, or as an alternative to providing a user interface presenting listings of matching or similar resale goods.

Figure 8:
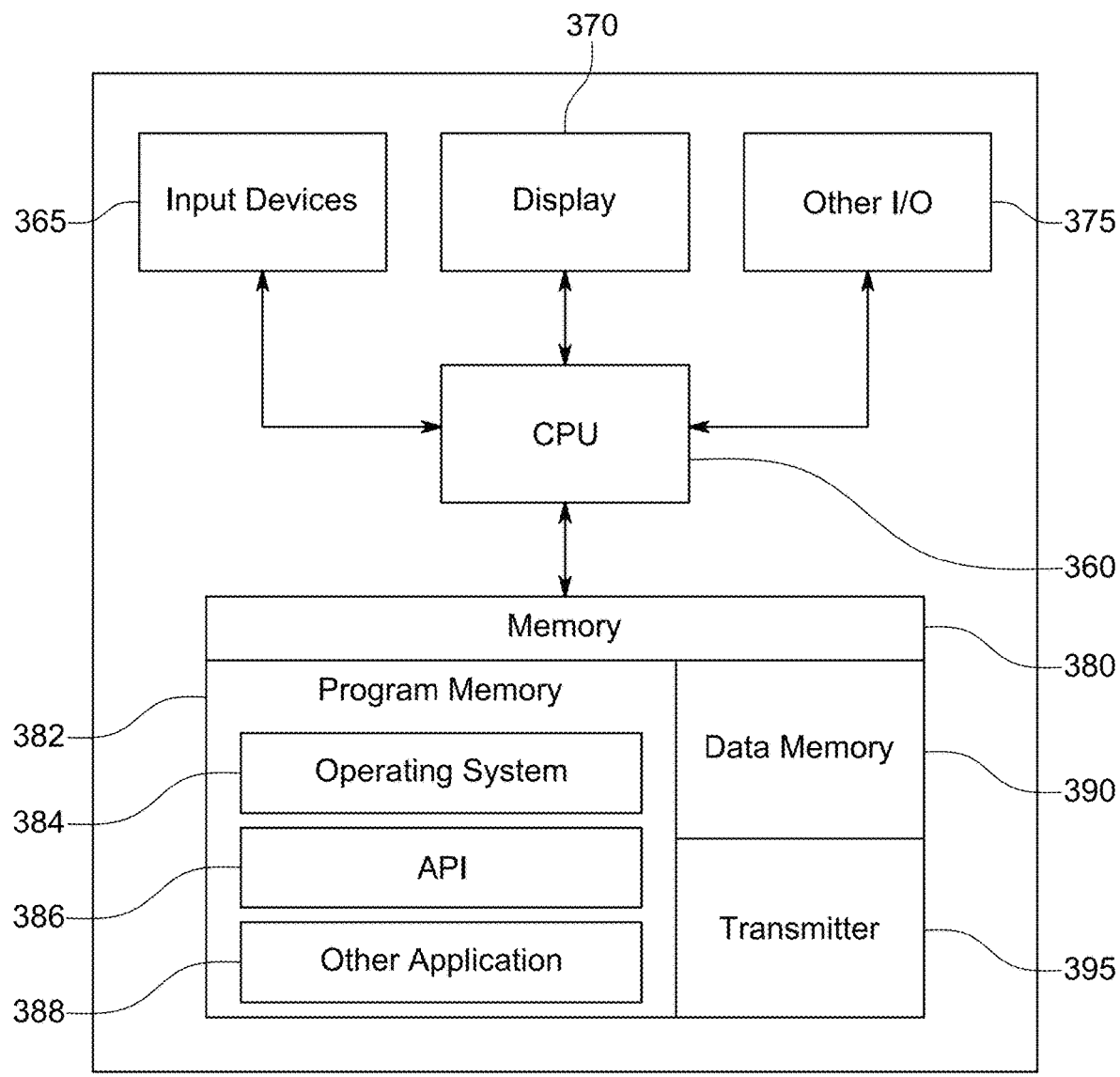
FIG. 8 is a block diagram of an exemplary user computing device, in accordance with aspects of this disclosure.

FIG. 8 is a block diagram illustrating a non-limiting example of user computing device 102. User computing device 102 may include hardware components that allow access to edit and query recommendation system 100. User computing device 102 may include one or more input devices 365 that provide input to central processing unit (CPU) 360. A hardware controller may interpret signals from input device 365 and communicate information to CPU 360 using a communication protocol. Input device 365 may comprise, but is not limited to, a mouse, a keyboard, a touchscreen, an infrared sensor, a touchpad, a wearable input device, a camera-based or image-based input device, a microphone, or other user input devices known to those of ordinary skill in the art.

CPU 360 may comprise a single processing unit or multiple processing units in a single device or distributed across multiple devices. CPU 360 may be coupled to other hardware devices, such as memory 380, by a PCI bus, SCSI bus, or other bus. CPU 360 may communicate with a hardware controller for devices such as display 370, which may display text and graphics. Display 370 may provide graphical and textual visual feedback to user 101, for example.

In some examples, display 370 may incorporate input device 365, such as by a touchscreen or an eye direction monitoring system. In some examples, display 370 is separate from input device 365. Non-limiting examples of display 370 include an LCD or LED display screen, a projected, holographic, virtual reality display, an augmented reality display (such as a heads-up display device or a head-mounted device), wearable device electronic glasses, contact lenses capable of computer-generated sensory input and displaying data, and so on. Other I/O devices 375, such as a network card, video card, audio card, USB, FireWire or other external device, camera, printer, speakers, CD-ROM drive, DVD drive, disk drive, or a Blu-Ray device, may be coupled to CPU 360.

CPU 360 may access memory 380, which may include volatile and/or non-volatile storage and read-only and/or writable memory. For example, memory 380 may comprise random access memory (RAM), CPU registers, read-only memory (ROM), and writable non-volatile memory, such as flash memory, hard drives, floppy disks, CDs, DVDs, magnetic storage devices, tape drives, device buffers, etc. Memory 380 is non-transitory and is not a propagating signal divorced from underlying hardware.

Memory 380 may comprise program memory 382 capable of storing programs and software, such as operating system 384, application programming interface (API) 386, and other application programs 388. Memory 380 may also comprise data memory 390 for storing database query results, configuration data, settings, user options and preferences, etc., which may be provided to program memory 382 or any other element of user device 102.

In some embodiments, user device 102 is a mobile computing device or smartphone such as an iPhone, Android-based phone, or Windows-based phone. Alternatively, user device 102 may be any other computing device such as a tablet, television, desktop computer, laptop computer, gaming system, wearable device electronic glasses, networked router, networked switch, networked, bridge, or any computing device capable of executing instructions with sufficient processor power and memory capacity to perform the operations of user device 102 while in communication with a network. User device 102 may have location tracking capabilities such as mobile location determination system (MLDS) or global positioning system (GPS), and may include one or more satellite radios capable of determining the geographical location of user computing device 102.

The embodiments disclosed herein were chosen and described to explain the principles of this disclosure and its practical applications, and to enable others of ordinary skill in the art to understand embodiments of this disclosure with various modifications as are suited to the particular use contemplated. The invention may be practiced with modification and alteration within the spirit and scope of the appended claims. Thus, this description is to be regarded as illustrative and not restrictive.

The invention claimed is:

1. A computer-implemented method for identifying resale good alternatives for retail goods, the method comprising:
   identifying a retail good on a retail goods webpage;
   extracting metadata of the retail good from the retail goods webpage by:
      extracting the metadata of the retail good using metadata heuristics that analyze metadata structures of the retail goods webpage;
      performing large language model (LLM)-based extraction to transform unstructured webpage content into structured retail good metadata; and
      identifying and caching selectors that target HTML tags containing the metadata of the retail good for re-use during subsequent extractions;
   classifying the retail good into a retail category using keyword heuristics and LLM-based classification;
   cropping an image of the retail good to isolate the retail good using the retail category and a segmentation foundation model;
   determining a descriptive color word for the retail good using clustering algorithms and color space mapping;
   generating image vector embeddings for the retail good using a machine learning (ML) image embedding model;
   generating text vector embeddings for the retail good using a ML text embedding model;
   retrieving multiple ranked result sets from a vector database of resale goods including a first result set generated from the image vector embeddings and a second result set generated from the text vector embeddings;
   merging the multiple ranked result sets into a unified result set;
   re-ranking the unified result set by:
      applying heuristics-based re-ranking;
      applying ML language model-based re-ranking; and
      applying preference-aware re-ranking; and
   returning the re-ranked unified result set to the user.

2. The method of claim 1, wherein the LLM-based extraction uses instruction-based prompting, few-shot prompting, or a fine-tuned language model to convert the unstructured webpage content into the structured retail good metadata.

3. The method of claim 1, wherein the segmentation foundation model comprises a segment anything model (SAM) or a grounding DINO model.

4. The method of claim 1, wherein the identifying and caching selectors is performed by a machine language (ML) selector extraction component that analyzes a document object model (DOM) of the retail goods webpage.

5. The method of claim 1 further comprising, where the retail goods webpage comprises multiple images of retail goods, applying size and website heuristics to identify a most representative image of the retail good.

6. The method of claim 1, wherein the ML image embedding model is a contrastive language-image pretraining (CLIP) model and the ML text embedding model is a sentence transformer.

7. The method of claim 1, wherein the ML image embedding model and the ML text embedding model are fine-tuned using multi-modal alignment, caption generation, and firsthand/secondhand vector alignment.

8. The method of claim 1, further comprising retrieving a third result set generated from a full-text search, and including the third result set in the multiple ranked result sets that are merged into a unified result set.

9. The method of claim 1, wherein approximate nearest neighbor (ANN) search algorithms are applied to retrieve the multiple ranked result sets from the vector database.

10. The method of claim 1, wherein the multiple ranked result sets are merged into a unified result set using a reciprocal rank fusion (RRF) algorithm.

11. The method of claim 1, wherein the heuristics-based re-ranking applies multiple heuristics to give ranking boosts to resale goods of particular relevance.

12. The method of claim 11, wherein the ranking boosts comprise price-based boosting, brand-based boosting, and condition-based boosting.

13. The method of claim 1, wherein the ML language model-based re-ranking filters out outliers that have not yet been recognized, balances the search results to minimize clusters of visually similar resale goods, and aligns result order with common user preferences.

14. The method of claim 13, wherein the ML language model for re-ranking is fine-tuned using labeling and using user behavior comprising click data and purchase conversion data.

15. The method of claim 1, wherein the preference-aware re-ranking comprises prompting the ML language model to incorporate qualitative preferences input by the user.

16. The method of claim 15, wherein the qualitative preferences are input by the user through a free-form natural language interface or a form-based user interface comprising sliders and toggles.

17. The method of claim 1, further comprising a data pipeline preparation process comprising:
   loading and parsing resale goods metadata from resale goods websites;
   cleaning the resale goods metadata using heuristics and LLM-based models;
   storing the resale goods metadata in a data warehouse;
   converting the resale goods metadata into vector embeddings; and
   ingesting the vector embeddings into the vector database.

18. The method of claim 17, wherein the resale goods metadata is loaded and parsed from partner websites using a loading adapter for each partner website that is configured to convert the resale goods metadata from the partner website into a unified format.

19. The method of claim 17, further comprising applying rule-based mapping to map the resale goods metadata to a standardized taxonomy.

20. The method of claim 1, further comprising:
collecting historical resale data for resale goods that closely match the retail good;
calculating an average resale value for the retail good based on the collected historical resale data;
determining an average resale retention percentage for a brand by analyzing resale data for multiple resale goods within an inventory of the brand;
estimating an estimated resale value of the retail good by applying the average resale retention percentage to a retail price of the retail good;
adjusting the estimated resale value based on factors comprising condition, market demand, and popularity;
updating the estimated resale value as new data becomes available; and
providing a final estimated resale value via a graphical user interface.

\* \* \* \* \*